US008357213B2

(12) United States Patent
Patton et al.

(10) Patent No.: US 8,357,213 B2
(45) Date of Patent: *Jan. 22, 2013

(54) APPARATUS, SYSTEM, AND METHOD FOR PROMOTING A SUBSTANTIALLY COMPLETE REACTION OF AN ANHYDROUS HYDRIDE REACTANT

(75) Inventors: John M. Patton, West Jordan, UT (US); J. Kevin Shurtleff, Orem, UT (US); Eric J. Ladd, West Jordan, UT (US)

(73) Assignee: Trulite, Inc., Houston, TX (US)

( * ) Notice: Subject to any disclaimer, the term of this patent is extended or adjusted under 35 U.S.C. 154(b) by 671 days.

This patent is subject to a terminal disclaimer.

(21) Appl. No.: 12/477,564

(22) Filed: Jun. 3, 2009

(65) Prior Publication Data

US 2009/0304554 A1 Dec. 10, 2009

Related U.S. Application Data

(63) Continuation of application No. 11/740,349, filed on Apr. 26, 2007, now Pat. No. 7,556,660, and a continuation-in-part of application No. 11/270,947, filed on Nov. 12, 2005, now Pat. No. 7,438,732, and a continuation-in-part of application No. 10/459,991, filed on Jun. 11, 2003, now Pat. No. 7,393,369.

(51) Int. Cl.
*B01J 8/02* (2006.01)
*H01M 8/06* (2006.01)

(52) U.S. Cl. ............. 48/61; 422/625; 422/626; 422/630

(58) Field of Classification Search ............... 48/61, 120, 48/174; 422/239, 211, 234, 236, 625, 626, 422/627, 630
See application file for complete search history.

(56) References Cited

U.S. PATENT DOCUMENTS

| 2,542,746 A | 2/1951 | Banus et al. ............ 423/288 |
| 2,935,382 A | 5/1960 | Osborn et al. |
| 3,113,832 A | 12/1963 | Kollonitsch et al. |

(Continued)

FOREIGN PATENT DOCUMENTS

EP      1514839      3/2005

(Continued)

OTHER PUBLICATIONS

"Fuel Chemistry News" Newsletter of the ACS Division of Fuel Chemistry, vol. 82, No. 2, Fall 2003.

(Continued)

*Primary Examiner* — Nina Bhat
(74) *Attorney, Agent, or Firm* — Kunzler Law Group, PC

(57) ABSTRACT

The apparatus includes a liquid permeable pouch that defines a cavity for maintaining an anhydrous hydride reactant, wherein the cavity comprises a cross-section such that a point within the cross-section is separated from a perimeter of the liquid permeable pouch by no more than double the permeation distance, and a cartridge configured to receive the liquid permeable pouch and a liquid reactant such that at least a portion of the liquid permeable pouch is submerged in the liquid reactant. The system includes a plurality of pouches formed from two rectangular sheets of liquid permeable material, and each pouch has a width selected such that each point within a cross-section is separated from the sheets by no more than double the permeation distance. The method includes joining the sheets, forming one or more seals to define a cavity, disposing anhydrous hydride within the cavity, and sealing the opening.

20 Claims, 12 Drawing Sheets

U.S. PATENT DOCUMENTS

| | | | |
|---|---|---|---|
| 3,133,837 A | 5/1964 | Eidensohn | 429/19 |
| 3,313,598 A | 4/1967 | Gluckstein | 23/211 |
| 3,449,078 A | 6/1969 | Quik et al. | 23/212 |
| 3,511,710 A | 5/1970 | Jung et al. | 136/86 |
| 3,649,360 A | 3/1972 | Bloomfield et al. | 136/86 |
| 3,734,863 A | 5/1973 | Beckert et al. | 252/188 |
| 3,940,474 A | 2/1976 | Huskins et al. | 423/648 |
| 3,977,990 A | 8/1976 | Beckert et al. | 252/188.3 |
| 3,985,865 A | 10/1976 | Hohne | |
| 4,000,003 A | 12/1976 | Baker et al. | 429/7 |
| 4,081,345 A | 3/1978 | Tolg et al. | 422/239 |
| 4,124,116 A | 11/1978 | McCabe, Jr. | |
| 4,155,712 A | 5/1979 | Taschek | 422/239 |
| 4,261,955 A | 4/1981 | Bailey, Jr. et al. | 422/239 |
| 4,261,956 A | 4/1981 | Adlhart | 422/239 |
| 4,433,633 A | 2/1984 | Caudy et al. | 114/54 |
| 4,436,793 A | 3/1984 | Adlhart | 429/19 |
| 4,463,063 A | 7/1984 | Adlhart | 429/19 |
| 4,463,066 A | 7/1984 | Adlhart et al. | 429/34 |
| 4,463,068 A | 7/1984 | Cohn et al. | 429/34 |
| 4,486,276 A | 12/1984 | Cohn et al. | 204/98 |
| 4,513,065 A | 4/1985 | Adlhart | 429/19 |
| 4,543,246 A | 9/1985 | Houser | 423/648 |
| 4,628,010 A | 12/1986 | Iwanciow | 429/19 |
| 4,740,504 A | 4/1988 | Hall et al. | 514/64 |
| 4,782,096 A | 11/1988 | Banquy | 518/704 |
| 4,940,667 A | 7/1990 | Goldstein et al. | 436/157 |
| 4,962,462 A | 10/1990 | Fekete | 364/492 |
| 4,968,393 A | 11/1990 | Mazur | 204/59 |
| 4,973,530 A | 11/1990 | Vanderborgh | 429/13 |
| 4,977,094 A | 12/1990 | Goldstein et al. | 136/157 |
| 4,978,451 A | 12/1990 | Taylor | 210/500 |
| 4,988,583 A | 1/1991 | Watkins et al. | 429/30 |
| 4,988,593 A | 1/1991 | Takai | |
| 5,046,604 A | 9/1991 | Forhetz et al. | |
| 5,047,301 A | 9/1991 | Adlhart et al. | 429/101 |
| 5,108,849 A | 4/1992 | Watkins et al. | 429/30 |
| 5,186,903 A | 2/1993 | Cornwell | 422/122 |
| 5,200,278 A | 4/1993 | Watkins et al. | 429/24 |
| 5,205,841 A | 4/1993 | Vaiman | 55/16 |
| 5,221,520 A | 6/1993 | Cornwell | 422/122 |
| 5,229,222 A | 7/1993 | Tsutsumi et al. | 429/19 |
| 5,264,299 A | 11/1993 | Krasij et al. | 429/30 |
| 5,292,600 A | 3/1994 | Kaufman | 429/39 |
| 5,294,410 A | 3/1994 | White | 422/171 |
| 5,314,762 A | 5/1994 | Hamada et al. | 429/37 |
| 5,366,820 A | 11/1994 | Tsutsumi et al. | 429/19 |
| 5,372,617 A | 12/1994 | Kerrebrock et al. | 48/61 |
| 5,382,478 A | 1/1995 | Chow | 429/26 |
| 5,514,353 A | 5/1996 | Adhart | 422/239 |
| 5,534,341 A | 7/1996 | Baines et al. | |
| 5,554,343 A | 9/1996 | Wade | 422/177 |
| 5,557,188 A | 9/1996 | Piercey | 320/5 |
| 5,593,640 A | 1/1997 | Long et al. | 422/111 |
| 5,599,640 A | 2/1997 | Lee et al. | 429/46 |
| 5,634,341 A | 6/1997 | Klanchar et al. | 60/673 |
| 5,667,753 A | 9/1997 | Jacobs et al. | |
| 5,674,450 A | 10/1997 | Lin et al. | |
| 5,683,828 A | 11/1997 | Spear et al. | 429/13 |
| 5,688,611 A | 11/1997 | Golben | 429/53 |
| 5,702,491 A | 12/1997 | Long et al. | 48/197 |
| 5,728,464 A | 3/1998 | Checketts | 428/403 |
| 5,747,189 A | 5/1998 | Perkins | 429/91 |
| 5,756,047 A | 5/1998 | West et al. | 422/37 |
| 5,770,739 A | 6/1998 | Lin et al. | |
| 5,785,934 A | 7/1998 | Jacobs et al. | |
| 5,804,329 A | 9/1998 | Amendola | 429/34 |
| 5,833,934 A | 11/1998 | Adlhart | 422/23 |
| 5,843,297 A | 12/1998 | Schmid et al. | 205/687 |
| 5,858,587 A | 1/1999 | Yamane et al. | 430/22 |
| 5,861,137 A | 1/1999 | Edlund | 423/652 |
| 5,863,671 A | 1/1999 | Spear | 429/12 |
| 5,876,666 A | 3/1999 | Lin et al. | |
| 5,932,365 A | 8/1999 | Lin et al. | 429/12 |
| 5,948,558 A | 9/1999 | Amendola | 429/50 |
| 5,955,039 A | 9/1999 | Dowdy | 422/189 |
| 5,961,923 A | 10/1999 | Nova et al. | |
| 5,962,155 A | 10/1999 | Kuranaka et al. | 429/20 |
| 5,976,725 A | 11/1999 | Gamo et al. | 429/25 |
| 5,996,976 A | 12/1999 | Murphy | 261/104 |
| 5,997,594 A | 12/1999 | Edlund et al. | 48/76 |
| 5,997,812 A | 12/1999 | Burnham et al. | 422/24 |
| 5,997,821 A | 12/1999 | Joshi | |
| 6,017,496 A | 1/2000 | Nova et al. | |
| 6,051,128 A | 4/2000 | Nacamuli | 208/79 |
| 6,051,331 A | 4/2000 | Spear, Jr. et al. | 429/34 |
| 6,066,409 A | 5/2000 | Ronne | 429/39 |
| 6,072,299 A | 6/2000 | Kurle et al. | 320/112 |
| 6,090,312 A | 7/2000 | Ziaka | 252/373 |
| 6,096,219 A | 8/2000 | Green et al. | 210/695 |
| 6,096,286 A | 8/2000 | Autenrieth | 423/651 |
| 6,097,175 A | 8/2000 | Yoon | 320/132 |
| 6,100,026 A | 8/2000 | Nova et al. | |
| 6,106,964 A | 8/2000 | Voss et al. | |
| 6,106,965 A | 8/2000 | Hirano et al. | 429/30 |
| 6,106,968 A | 8/2000 | Johnson et al. | 429/50 |
| 6,108,968 A | 8/2000 | Peng | 47/24 |
| 6,110,429 A | 8/2000 | Johansing, Jr. | 422/173 |
| 6,110,611 A | 8/2000 | Stuhler et al. | 429/13 |
| 6,156,450 A | 12/2000 | Bailey | 429/93 |
| 6,198,253 B1 | 3/2001 | Kurle et al. | 320/132 |
| 6,221,117 B1 | 4/2001 | Edlund et al. | 48/76 |
| 6,231,825 B1 | 5/2001 | Colby et al. | 423/286 |
| 6,236,326 B1 | 5/2001 | Murphy | 340/636 |
| 6,238,814 B1 | 5/2001 | Horiguchi et al. | 429/12 |
| 6,248,469 B1 | 6/2001 | Formato et al. | 429/41 |
| 6,250,078 B1 | 6/2001 | Amendola et al. | 60/509 |
| 6,268,077 B1 | 7/2001 | Kelley et al. | 429/33 |
| 6,274,093 B1 | 8/2001 | Long et al. | 422/129 |
| 6,284,459 B1 | 9/2001 | Nova et al. | |
| 6,289,889 B1 | 9/2001 | Bell et al. | |
| 6,309,611 B1 | 10/2001 | Tabatabaie-Raissi et al. | 422/186.3 |
| 6,312,848 B1 | 11/2001 | Kilb et al. | 429/162 |
| 6,315,870 B1 | 11/2001 | Tabatabaie-Raissi et al. | 204/157.3 |
| 6,334,936 B1 | 1/2002 | Tabatabaie-Raissi et al. | 204/157.3 |
| 6,337,120 B1 | 1/2002 | Sasaki et al. | 428/66.04 |
| 6,342,128 B1 | 1/2002 | Tabatabaie-Raissi et al. | 204/157.15 |
| 6,387,228 B1 | 5/2002 | Maget | |
| 6,387,557 B1 | 5/2002 | Krasij et al. | 429/32 |
| 6,399,234 B2 | 6/2002 | Bonk et al. | 429/32 |
| 6,428,918 B1 | 8/2002 | Fuglevand et al. | 429/13 |
| 6,433,129 B1 | 8/2002 | Amendola et al. | 528/271 |
| 6,454,871 B1 | 9/2002 | Labib et al. | 134/8 |
| 6,468,682 B1 | 10/2002 | Fuglevand et al. | 429/26 |
| 6,468,694 B1 | 10/2002 | Amendola | 429/218.1 |
| 6,483,274 B2 | 11/2002 | Lee | 320/132 |
| 6,495,278 B1 | 12/2002 | Schmid et al. | 429/30 |
| 6,497,973 B1 | 12/2002 | Amendola | 429/19 |
| 6,497,974 B2 | 12/2002 | Fuglevand | 429/22 |
| 6,500,577 B2 | 12/2002 | Foster | 429/32 |
| 6,503,649 B1 | 1/2003 | Czajkowski et al. | 429/23 |
| 6,503,711 B1 | 1/2003 | Krull et al. | 435/6 |
| 6,524,542 B2 | 2/2003 | Amendola et al. | 423/286 |
| 6,531,630 B2 | 3/2003 | Vidalin | 562/519 |
| 6,533,827 B1 | 3/2003 | Cisar et al. | 29/623.4 |
| 6,534,033 B1 | 3/2003 | Amendola et al. | 423/648.1 |
| 6,541,147 B1 | 4/2003 | McLean et al. | 249/35 |
| 6,544,400 B2 | 4/2003 | Hockaday et al. | 205/338 |
| 6,544,679 B1 | 4/2003 | Petillo et al. | 429/34 |
| 6,551,561 B1 | 4/2003 | Tabatabaie-Raissi et al. | 422/186 |
| 6,554,400 B1 | 4/2003 | Aoki | 347/47 |
| 6,576,350 B2 | 6/2003 | Buxbaum | 428/670 |
| 6,576,361 B1 | 6/2003 | Barton | |
| 6,582,666 B2 | 6/2003 | Tabatabaie-Raissi et al. | 422/186 |
| 6,586,563 B1 | 7/2003 | Ortega et al. | 528/394 |
| 6,599,653 B1 | 7/2003 | Cummins et al. | 429/35 |
| 6,602,631 B1 | 8/2003 | Cisar et al. | 429/34 |
| 6,607,857 B2 | 8/2003 | Blunk et al. | 429/34 |
| 6,610,112 B1 | 8/2003 | Klock et al. | 48/214 R |
| 6,645,651 B2 | 11/2003 | Hockaday et al. | 429/19 |
| 6,649,097 B2 | 11/2003 | Sasaki et al. | 264/102 |

| Patent No. | Date | Inventor | Class |
|---|---|---|---|
| 6,653,003 B1 | 11/2003 | Tsai et al. | 429/17 |
| 6,670,444 B2 | 12/2003 | Amendola et al. | 528/394 |
| 6,683,025 B2 | 1/2004 | Amendola et al. | 502/439 |
| 6,685,570 B2 | 2/2004 | Zilberman et al. | 464/94 |
| 6,688,106 B2 | 2/2004 | Okusawa et al. | 60/653 |
| 6,696,204 B2 | 2/2004 | Sato et al. | |
| 6,703,722 B2 | 3/2004 | Christiansen | 307/71 |
| 6,706,909 B1 | 3/2004 | Snover et al. | 558/296 |
| 6,730,269 B2 | 5/2004 | Mirkin et al. | 422/68.1 |
| 6,733,916 B2 | 5/2004 | Mizuno | 429/36 |
| 6,743,542 B2 | 6/2004 | Krasij et al. | 429/36 |
| 6,745,801 B1 | 6/2004 | Cohen et al. | 141/231 |
| 6,746,496 B1 | 6/2004 | Kravitz et al. | 481/118.5 |
| 6,755,219 B1 | 6/2004 | Bolle | 14/19 |
| 6,764,786 B2 | 7/2004 | Morrow et al. | 429/37 |
| 6,766,817 B2 | 7/2004 | da Silva | |
| 6,770,186 B2 | 8/2004 | Rosenfeld et al. | 205/343 |
| 6,777,127 B2 | 8/2004 | Einhart et al. | 429/35 |
| 6,783,741 B2 | 8/2004 | Edlund et al. | 422/191 |
| 6,787,008 B2 | 9/2004 | Joshi et al. | 204/252 |
| 6,790,416 B2 | 9/2004 | Mann et al. | |
| 6,794,418 B2 | 9/2004 | Sogge et al. | 518/706 |
| 6,805,987 B2 | 10/2004 | Bai et al. | 429/23 |
| 6,811,764 B2 | 11/2004 | Jorgensen et al. | 423/658.2 |
| 6,811,906 B2 | 11/2004 | Bai et al. | 429/13 |
| 6,811,918 B2 | 11/2004 | Blunk et al. | 429/40 |
| 6,815,110 B2 | 11/2004 | Marsh | 429/30 |
| 6,818,334 B2 | 11/2004 | Tsang | 429/17 |
| 6,821,499 B2 | 11/2004 | Jorgensen | 423/648.1 |
| 6,827,747 B2 | 12/2004 | Lisi et al. | 29/623.1 |
| 6,846,635 B1 | 1/2005 | Anderson et al. | 435/7.1 |
| 6,887,701 B2 | 5/2005 | Anderson et al. | 435/287.1 |
| 6,899,967 B2 | 5/2005 | Johnson | 429/19 |
| 6,901,302 B2 | 5/2005 | Kami | 700/90 |
| 6,904,533 B2 | 6/2005 | Kuo et al. | 713/322 |
| 6,918,404 B2 | 7/2005 | Dias da Silva | |
| 6,932,847 B2 | 8/2005 | Amendola et al. | 48/76 |
| 6,939,529 B2 | 9/2005 | Strizki et al. | 423/658.2 |
| 7,004,207 B2 | 2/2006 | Finkelshtain et al. | 141/2 |
| 7,019,105 B2 | 3/2006 | Amendola et al. | 528/271 |
| 7,052,671 B2 | 5/2006 | McClaine et al. | 423/658.2 |
| 7,052,793 B2 | 5/2006 | Formato et al. | 429/33 |
| 7,066,586 B2 | 6/2006 | da Silva | |
| 7,074,369 B2 | 7/2006 | Tabatabaie-Raissi et al. | 422/177 |
| 7,074,509 B2 | 7/2006 | Rosenfield | 429/19 |
| 7,083,657 B2 | 8/2006 | Mohring et al. | 48/61 |
| 7,097,813 B2 | 8/2006 | Ord et al. | 422/129 |
| 7,105,033 B2 | 9/2006 | Strizki et al. | 48/61 |
| 7,108,777 B2 | 9/2006 | Xu et al. | 205/408 |
| 7,147,692 B2 | 12/2006 | Fornai et al. | 95/210 |
| 7,166,269 B2 | 1/2007 | Tanaka et al. | |
| 7,169,489 B2 | 1/2007 | Redmond | |
| 7,179,638 B2 | 2/2007 | Anderson et al. | 435/287.2 |
| 7,259,019 B2 | 8/2007 | Pawliszyn et al. | 436/178 |
| 7,285,255 B2 | 10/2007 | Kadlec et al. | |
| 7,291,191 B2 | 11/2007 | Kaye | 55/385.4 |
| 7,393,369 B2 | 7/2008 | Shurtleff | |
| 7,572,536 B2 | 8/2009 | Shibata et al. | |
| 2001/0000380 A1 | 4/2001 | Buxbaum | 95/55 |
| 2001/0025289 A1 | 9/2001 | Jenkins et al. | 708/141 |
| 2001/0043274 A1 | 11/2001 | Shepherd et al. | 348/241 |
| 2001/0045061 A1 | 11/2001 | Edlund et al. | 48/76 |
| 2001/0045364 A1 | 11/2001 | Hockaday et al. | 205/338 |
| 2001/0046616 A1 | 11/2001 | Mossman | 429/13 |
| 2001/0050218 A1 | 12/2001 | Tabatabaie-Raissi et al. | 204/157.15 |
| 2002/0001537 A1 | 1/2002 | Hlebovy et al. | 422/28 |
| 2002/0018742 A1 | 2/2002 | Hoke et al. | 423/219 |
| 2002/0022162 A1 | 2/2002 | Kagitani | 429/17 |
| 2002/0022168 A1 | 2/2002 | Faris et al. | 429/27 |
| 2002/0022170 A1 | 2/2002 | Franklin et al. | 429/34 |
| 2002/0045075 A1 | 4/2002 | Pinto et al. | 429/15 |
| 2002/0045082 A1 | 4/2002 | Marsh | 429/30 |
| 2002/0045085 A1 | 4/2002 | Formato et al. | 429/33 |
| 2002/0058168 A1 | 5/2002 | Voss et al. | 429/13 |
| 2002/0076598 A1 | 6/2002 | Bostaph et al. | 429/38 |
| 2002/0083643 A1 | 7/2002 | Amendola et al. | 48/61 |
| 2002/0106313 A1 | 8/2002 | Tabatabaie-Raissi et al. | 422/173 |
| 2002/0106541 A1 | 8/2002 | Yamada et al. | 429/21 |
| 2002/0106550 A1 | 8/2002 | Nishiki et al. | 429/42 |
| 2002/0136937 A1 | 9/2002 | Kelley et al. | |
| 2002/0150804 A1 | 10/2002 | Srinivasan et al. | 429/32 |
| 2002/0165417 A1 | 11/2002 | Numaguchi et al. | 585/310 |
| 2002/0166286 A1 | 11/2002 | McClaine et al. | 48/197 |
| 2002/0171021 A1 | 11/2002 | Goretti | 248/455 |
| 2002/0177015 A1 | 11/2002 | Fuglevand | 429/12 |
| 2002/0177018 A1 | 11/2002 | Fuglevand | 429/12 |
| 2002/0177042 A1 | 11/2002 | Amendola | 429/218.1 |
| 2002/0182470 A1 | 12/2002 | Agizy et al. | 429/34 |
| 2003/0001299 A1 | 1/2003 | Gopalsami et al. | |
| 2003/0003038 A1 | 1/2003 | Amendola et al. | 423/286 |
| 2003/0008187 A1 | 1/2003 | Higashiyama et al. | 429/19 |
| 2003/0008194 A1 | 1/2003 | Cargneli et al. | 429/39 |
| 2003/0009942 A1 | 1/2003 | Amendola et al. | 48/61 |
| 2003/0012999 A1 | 1/2003 | Yoshioka et al. | 429/34 |
| 2003/0037487 A1 | 2/2003 | Amendola et al. | 48/76 |
| 2003/0049857 A1 | 3/2003 | Chan | 436/170 |
| 2003/0051785 A1 | 3/2003 | Gauthier et al. | |
| 2003/0085111 A1 | 5/2003 | Tabatabaie-Raissi et al. | 204/157.15 |
| 2003/0091879 A1 | 5/2003 | Rusta-Sellehy et al. | |
| 2003/0091882 A1 | 5/2003 | Schmidt et al. | 429/23 |
| 2003/0092877 A1 | 5/2003 | Amendola et al. | 528/394 |
| 2003/0098258 A1 | 5/2003 | Gregory et al. | 208/89 |
| 2003/0111908 A1 | 6/2003 | Christensen | 307/43 |
| 2003/0113259 A1 | 6/2003 | Rusta-Sallehy et al. | 423/658.2 |
| 2003/0114632 A1 | 6/2003 | Ortega et al. | 528/196 |
| 2003/0159354 A1 | 8/2003 | Edlund et al. | 48/127.9 |
| 2003/0162059 A1 | 8/2003 | Gelsey | 429/17 |
| 2003/0180603 A1 | 9/2003 | Richards | 429/38 |
| 2003/0194596 A1 | 10/2003 | Ye et al. | 429/38 |
| 2003/0204993 A1 | 11/2003 | Holland et al. | 48/27.9 |
| 2003/0219371 A1 | 11/2003 | Amendola | 423/351 |
| 2003/0219641 A1 | 11/2003 | Petillo | 429/38 |
| 2003/0223926 A1 | 12/2003 | Edlund et al. | 422/198 |
| 2003/0226763 A1 | 12/2003 | Narayanan et al. | 205/637 |
| 2003/0228252 A1 | 12/2003 | Shurtleff | 423/657 |
| 2003/0228505 A1 | 12/2003 | Tsang | 429/19 |
| 2003/0232225 A1 | 12/2003 | Maruyama et al. | 429/22 |
| 2003/0235724 A1 | 12/2003 | Ord et al. | |
| 2003/0235749 A1 | 12/2003 | Haltiner, Jr. et al. | 429/38 |
| 2004/0005488 A1 | 1/2004 | Faris et al. | 429/23 |
| 2004/0009379 A1 | 1/2004 | Amendola et al. | 429/17 |
| 2004/0009392 A1 | 1/2004 | Petillo et al. | 429/122 |
| 2004/0011662 A1 | 1/2004 | Xu et al. | 205/408 |
| 2004/0025808 A1 | 2/2004 | Cheng | 123/3 |
| 2004/0031695 A1 | 2/2004 | Oloman et al. | 205/615 |
| 2004/0033194 A1 | 2/2004 | Amendola et al. | 423/658.2 |
| 2004/0035054 A1 | 2/2004 | Mohring et al. | 48/61 |
| 2004/0043274 A1 | 3/2004 | Scartozzi et al. | 429/34 |
| 2004/0047801 A1 | 3/2004 | Petillo et al. | 423/657 |
| 2004/0052723 A1 | 3/2004 | Jorgensen | 423/648.1 |
| 2004/0053100 A1 | 3/2004 | Stanley et al. | 429/30 |
| 2004/0062680 A1 | 4/2004 | Kampa | |
| 2004/0065865 A1 | 4/2004 | Desgardin et al. | 252/188.25 |
| 2004/0067195 A1 | 4/2004 | Strizki et al. | 423/658.2 |
| 2004/0072041 A1 | 4/2004 | Koschany | 429/23 |
| 2004/0081884 A1 | 4/2004 | Bean et al. | 429/98 |
| 2004/0109374 A1 | 6/2004 | Sundar | 365/226 |
| 2004/0115493 A1 | 6/2004 | Kim | 429/20 |
| 2004/0120889 A1 | 6/2004 | Shah et al. | 423/657 |
| 2004/0121196 A1 | 6/2004 | Liu et al. | 429/12 |
| 2004/0146769 A1 | 7/2004 | Birschbach | 429/34 |
| 2004/0148857 A1 | 8/2004 | Strizki et al. | 48/127.9 |
| 2004/0160216 A1 | 8/2004 | Speranza et al. | 320/140 |
| 2004/0161646 A1 | 8/2004 | Rezachek et al. | 429/19 |
| 2004/0161652 A1 | 8/2004 | Ovshinsky et al. | 429/34 |
| 2004/0166057 A1 | 8/2004 | Schell et al. | 423/658.2 |
| 2004/0180247 A1 | 9/2004 | Higashiyama et al. | 429/19 |
| 2004/0180253 A1 | 9/2004 | Fisher | 429/34 |
| 2004/0191152 A1 | 9/2004 | Amendola et al. | 423/288 |
| 2004/0191588 A1 | 9/2004 | Eshraghi et al. | 429/19 |
| 2004/0200903 A1 | 10/2004 | Ohya et al. | 235/492 |
| 2004/0214056 A1 | 10/2004 | Gore | 429/20 |
| 2004/0214057 A1 | 10/2004 | Fuglevand et al. | 429/20 |

| | | | |
|---|---|---|---|
| 2004/0219398 A1 | 11/2004 | Calhoon | 429/13 |
| 2004/0219399 A1 | 11/2004 | Zhu et al. | 429/13 |
| 2004/0241065 A1 | 12/2004 | Kampa et al. | |
| 2004/0253496 A1 | 12/2004 | Foster | 429/30 |
| 2005/0008908 A1 | 1/2005 | Kaye et al. | 429/20 |
| 2005/0013771 A1 | 1/2005 | Amendola | 423/658.2 |
| 2005/0014044 A1 | 1/2005 | Thirukkovalur et al. | 429/26 |
| 2005/0016840 A1 | 1/2005 | Petillo | 204/248 |
| 2005/0017216 A1 | 1/2005 | Poetsch et al. | 252/299.61 |
| 2005/0017646 A1 | 1/2005 | Boulos et al. | 315/111.41 |
| 2005/0031925 A1 | 2/2005 | Ofer et al. | 429/30 |
| 2005/0036941 A1 | 2/2005 | Bae et al. | |
| 2005/0038267 A1 | 2/2005 | Poetsch et al. | 549/294 |
| 2005/0058595 A1 | 3/2005 | Shi et al. | 423/657 |
| 2005/0058990 A1 | 3/2005 | Guia et al. | 435/5 |
| 2005/0084723 A1 | 4/2005 | Mori | |
| 2005/0106097 A1 | 5/2005 | Graham et al. | |
| 2005/0118470 A1 | 6/2005 | Harada et al. | |
| 2005/0124016 A1 | 6/2005 | LaDu et al. | 435/7.92 |
| 2005/0132640 A1 | 6/2005 | Kelly et al. | 44/301 |
| 2005/0135996 A1 | 6/2005 | Ortega et al. | 423/648.1 |
| 2005/0136300 A1 | 6/2005 | Dyer | 429/19 |
| 2005/0148091 A1 | 7/2005 | Kitaguchi et al. | 436/164 |
| 2005/0162122 A1 | 7/2005 | Dunn et al. | 320/101 |
| 2005/0233184 A1 | 10/2005 | Dunn et al. | 429/12 |
| 2005/0238573 A1 | 10/2005 | Zhang et al. | 423/648.1 |
| 2005/0247552 A1 | 11/2005 | TeGrotenhuis et al. | 201/41 |
| 2005/0268555 A1 | 12/2005 | Amendola et al. | 48/61 |
| 2005/0271905 A1 | 12/2005 | Dunn et al. | 429/11 |
| 2005/0276727 A1 | 12/2005 | Pawliszyn et al. | 422/99 |
| 2005/0276746 A1 | 12/2005 | Zhang et al. | 423/651 |
| 2006/0006108 A1 | 1/2006 | Arias et al. | |
| 2006/0008687 A1 | 1/2006 | Kaye et al. | 429/20 |
| 2006/0014069 A1 | 1/2006 | Kaye et al. | 429/34 |
| 2006/0014070 A1 | 1/2006 | Kaye et al. | 429/34 |
| 2006/0021279 A1 | 2/2006 | Mohring et al. | 48/61 |
| 2006/0024543 A1 | 2/2006 | Kaye et al. | 429/22 |
| 2006/0024553 A1 | 2/2006 | Kaye et al. | 429/34 |
| 2006/0024554 A1 | 2/2006 | Kaye et al. | 429/34 |
| 2006/0029848 A1 | 2/2006 | Kaye et al. | |
| 2006/0058527 A1 | 3/2006 | Kirsch et al. | 544/333 |
| 2006/0059778 A1 | 3/2006 | Shurtleff et al. | 48/61 |
| 2006/0073365 A1 | 4/2006 | Kaye | 429/19 |
| 2006/0090397 A1 | 5/2006 | Edlund et al. | 48/61 |
| 2006/0102489 A1 | 5/2006 | Kelly | 205/357 |
| 2006/0102491 A1 | 5/2006 | Kelly et al. | 205/407 |
| 2006/0141332 A1 | 6/2006 | Cortright et al. | |
| 2006/0144701 A1 | 7/2006 | Kelly | 204/267 |
| 2006/0169593 A1 | 8/2006 | Xu et al. | 205/406 |
| 2006/0191198 A1 | 8/2006 | Rosenzweig et al. | |
| 2006/0191199 A1 | 8/2006 | Rosenzweig et al. | |
| 2006/0196112 A1 | 9/2006 | Berry et al. | 44/550 |
| 2006/0210841 A1 | 9/2006 | Wallace et al. | 429/12 |
| 2006/0225350 A1 | 10/2006 | Spallone et al. | 48/198.2 |
| 2006/0236606 A1 | 10/2006 | Strizki et al. | 48/127.9 |
| 2006/0269470 A1 | 11/2006 | Zhang et al. | 423/648.1 |
| 2006/0292067 A1 | 12/2006 | Zhang et al. | 423/648.1 |
| 2006/0292420 A1 | 12/2006 | Goto et al. | 429/34 |
| 2006/0293173 A1 | 12/2006 | Zhang et al. | 502/182 |
| 2007/0011251 A1 | 1/2007 | McNamara et al. | 709/206 |
| 2007/0020510 A1 | 1/2007 | Dunn et al. | 429/65 |
| 2007/0081939 A1 | 4/2007 | Berry et al. | |
| 2007/0099039 A1 | 5/2007 | Galloway | 429/19 |
| 2007/0116600 A1 | 5/2007 | Kochar et al. | 422/65 |
| 2007/0189940 A1 | 8/2007 | Shurtleff et al. | |
| 2007/0212281 A1 | 9/2007 | Kadlec et al. | |
| 2007/0243431 A1 | 10/2007 | Zhu et al. | 429/19 |
| 2007/0244324 A1 | 10/2007 | Brady et al. | 544/301 |
| 2007/0271844 A1 | 11/2007 | Mohring et al. | |
| 2007/0274904 A1 | 11/2007 | Popham et al. | 423/652 |
| 2007/0287054 A1 | 12/2007 | Ueda et al. | 429/34 |
| 2008/0015361 A1 | 1/2008 | Khare et al. | 548/491 |
| 2008/0063913 A1 | 3/2008 | Hirayama | 429/24 |
| 2009/0025293 A1 | 1/2009 | Patton et al. | |

FOREIGN PATENT DOCUMENTS

| | | |
|---|---|---|
| JP | 54121292 | 9/1979 |
| JP | 59078901 | 10/1982 |

OTHER PUBLICATIONS

"VI.B.4 DOE Chemical Hydrogen Storage Center of Excellence" Tumas, W. et al., FY 2005 Progress Report.

"Review of Chemical Processes for the Synthesis of Sodium Borohydride" Wo, Y. et al., Millennium Cell Inc., Aug. 2004.

"A safe, portable, hydrogen gas generator using aqueous borohydride solution and Ru catalyst" Amendola, S.C. et al., International Journal of Hydrogen Energy 25 (2000) 969-975.

Messina-Boyer, Chris. "Millennium Cell Receives Patent on System for Hydrogen Generation," Millennium Cell, Inc., Eatontown, NEWS, Mar. 18, 2003.

"A Novel High Power Density Borohydride-Air Cell," Amendola S.C. et al., Journal of Power Sources, vol. 84, No. 1, Nov. 1999, pp. 130-133(4).

"Enabling Fuel Cells for Standby Power-Chemical Hydride Fueling Technology," Smith, G.M., et al. Millennium Cell Inc., Eatontown, Telecommunications Energy Conference, 2004, Sep. 19-23, 2004.

"Recent Advances in Hydrogen Storage in Metal-Containing Inorganic Nanostructures and Related Materials," Seayad, A.M., et al. Copyright 2004 May 19, 2004.

"Hydrogn Generation Via Sodium Borohydride," Mohring, R.M., et al. Millennium Cell, Inc., Eatontown, AIP Conference Proceedings—Jul. 11, 2003—vol. 671, Issue 1, pp. 90-100.

"Solid Storage," Luzader, R., Millennium Cell, Inc., Eatontown, NEWS, Jun./Jul. 2003.

"Will Fuel Cells Replace Batteries in Mobile Devices?" Paulson, L.D. Millennium Cell, Inc. Eatontown, NEWS, Nov. 2003.

"Catalytic Reformer and Refinery Hydrogen System," Pall Corporation Copyright 1996, East Hills, New York.

"Dollinger Hydrogen Purification System," B & H Dollinger Filters, May 8, 2008, http://www.bhindust.com/dollinger/Dollinger_Hydrogen_Purification_System.htm.

"Recovery and Purification of Hydrogen Using PSA Technology," NATCO, May 8, 2008, http://www.natcogroup.com/Content.asp?t=ProductPage&ProductID=70.

QuestAir H-3200: Hydrogen Purification PSA System, QuestAir Technologies, British Columbia, Canada 2008.

APPARATUS, SYSTEM, AND METHOD FOR PROMOTING A SUBSTANTIALLY COMPLETE REACTION OF AN ANHYDROUS HYDRIDE REACTANT

CROSS-REFERENCES TO RELATED APPLICATIONS

This application is a continuation of and claims priority to U.S. patent application Ser. No. 11/740,349 entitled "Apparatus, System, and Method for Promoting a Substantially Complete Reaction of an Anhydrous Hydride Reactant" and filed on Apr. 26, 2007, issued as U.S. Pat. No. 7,556,660, and is a continuation-in-part of and claims priority to U.S. patent application Ser. No. 11/270,947 entitled "Hydrogen Generator Cartridge" and filed on Nov. 12, 2005 for J. Kevin Shurtleff, et al., issued as U.S. Pat. No. 7,438,732, which is incorporated herein by reference for all purposes as well as all previous applications upon which U.S. patent application Ser. No. 11/270,947 relies. This application is also a continuation-in-part of and claims priority to U.S. patent application Ser. No. 10/459,991 entitled "Apparatus, System, and Method for Generating Hydrogen" and filed on Jun. 11, 2003 for J. Kevin Shurtleff, issued as U.S. Pat. No. 7,393,369, which is incorporated herein by reference for all purposes as well as all previous applications upon which U.S. patent application Ser. No. 10/459,991 relies.

BACKGROUND OF THE INVENTION

1. Field of the Invention

The present invention relates to apparatuses and methods for producing hydrogen. The embodiments described herein relate to apparatuses and methods for releasing hydrogen from chemical hydrides.

2. Description of the Related Art

Various energy sources are used to fuel today's society. Fossil fuels such as coal, oil, and gas are some of the most commonly used fuels due to the comparatively large quantities available and minimal expense required to locate, collect, and refine the fossil fuels into usable energy sources. Alternative energy sources are available. Some of the alternative energy sources are readily available; however, the cost to generate, collect, or refine the alternative energy sources traditionally outweighs the benefits gained from the alternative energy sources.

Hydrogen is a plentiful alternative energy source; however, hydrogen generally exists as a molecule combined with one or more other elements. The additional elements add mass and may prevent the hydrogen from being a usable energy source. As a result, pure hydrogen is desired for use as an energy source. Pure hydrogen comprises free hydrogen atoms or molecules comprising only hydrogen atoms. Producing pure hydrogen using conventional methods is generally cost prohibitive.

Conventionally, pure hydrogen is generated by a chemical reaction which produces hydrogen molecules. One such chemical reaction occurs between water ($H_2O$) and chemical hydrides. Chemical hydrides are molecules comprising hydrogen and one or more alkali or alkali-earth metals. Examples of chemical hydrides include lithium hydride (LiH), lithium tetrahydridoaluminate ($LiAlH_4$), lithium tetrahydridoborate ($LiBH_4$), sodium hydride (NaH), sodium tetrahydridoaluminate ($NaAlH_4$), sodium tetrahydridoborate ($NaBH_4$), and the like. The chemical hydrides produce large quantities of pure hydrogen when reacted with water, as shown in reaction 1.

$$NaBH_4 + 2H_2O \rightarrow NaBO_2 + 4H_2 \qquad (1)$$

Recently, the interest in hydrogen generation from chemical hydrides has increased, because of the development of lightweight, compact Proton Exchange Membrane (PEM) fuel cells. One by-product of the PEM fuel cells is water that can be used or reused to produce pure hydrogen from chemical hydrides for fuelling the PEM fuel cell. The combination of PEM fuel cells with a chemical hydride hydrogen generator offers advantages over other energy storage devices in terms of gravimetric and volumetric energy density.

Unfortunately, the prior art has encountered unresolved problems producing pure hydrogen from chemical water/hydride reactions. Specifically, conventional systems, methods, and apparatus have not successfully controlled the chemical reaction between the water and the chemical hydride without adversely affecting the gravimetric and volumetric energy density of the overall system.

The chemical reaction between water and chemical hydrides is very severe and highly exothermic. The combination of the water and the chemical hydride must be precisely controlled to prevent a runaway reaction or an explosion. Many attempts have been made to properly control the reaction while still preserving the gravimetric and volumetric energy density provided by the chemical hydrides One attempt to properly control the reaction involves separating water from the chemical hydride using a membrane. Generally, the membrane passes water because of a difference in water pressure across the membrane. Water pressure on the side of the membrane opposite the chemical hydride pushes the water through the membrane. Other membranes utilize a capillary action to transport water from one side of the membrane to the other. Consequently, a water supply must be provided that supplies water to the water side of the membrane to be transported by capillary action to the chemical hydride side of the membrane.

Another unfortunate side effect of such a system is that often times the chemical or anhydrous hydride will "gum" or "clump" as water is introduced. Gumming or clumping refers to the spheres or other geometric shapes formed by the chemical hydride during the reaction. Water is able to react the outer portion of the "clump" to a certain depth, however, generally large portions of the "clump" remain unreacted because water does not penetrate deeply enough. Consequently, a large percentage of the chemical hydride can remain unreacted. This is unacceptable.

Accordingly, what is needed is an improved apparatus, system, and method that overcomes the problems and disadvantages of the prior art. The apparatus, system, and method should promote a substantially complete reaction of an anhydrous hydride reactant. In particular, the apparatus, system, and method should control a chemical reaction between water and a chemical hydride using a liquid permeable material without relying on a water pressure differential across the liquid permeable material. The liquid permeable material should allow substantially only water to pass. In addition, the apparatus, system, and method should control a chemical reaction between water and a chemical hydride using a liquid permeable material that functions to maintain a thin uniform distribution of anhydrous hydride within a reaction cartridge. Such an apparatus, system, and method are herein disclosed.

SUMMARY OF THE INVENTION

The present invention has been developed in response to the present state of the art, and in particular, in response to the problems and needs in the art that have not yet been fully solved by currently available hydrogen generation systems. Accordingly, the present invention has been developed to provide an apparatus, system, and method for promoting a substantially complete reaction of anhydrous hydride that overcome many or all of the above-discussed shortcomings in the art.

The apparatus is provided with a liquid permeable pouch that defines a cavity. A solid anhydrous hydride reactant is disposed within the cavity, the solid anhydrous hydride reactant having a permeation distance, and wherein the cavity comprises a cross-section such that each point within the cross-section is separated from a perimeter of the liquid permeable pouch by no more than double the permeation distance. The apparatus also includes a cartridge configured to receive the liquid permeable pouch and a liquid reactant such that at least a portion of the liquid permeable pouch is submerged in the liquid reactant.

In one embodiment, the permeation distance comprises a distance the liquid reactant is capable of traveling in reacted hydride. The apparatus may also include a plurality of tubular liquid permeable pouches connected in a side-by-side configuration. The cartridge may be cylindrical and be configured to receive a plurality of liquid permeable pouches that are rolled. The longitudinal axis of the spiral configuration may be oriented coaxial with a longitudinal axis of the cartridge. The plurality of liquid permeable pouches are disposed within the cartridge such that the plurality of liquid pouches form one or more liquid channels directing a flow of liquid reactant around the plurality of liquid permeable pouches in one embodiment of the apparatus.

In a further embodiment, the apparatus includes a plurality of liquid conduits radially spaced about a longitudinal axis of the cartridge, each liquid conduit positioned along side at least one tubular liquid permeable pouch. Furthermore, the cartridge is configured to receive a plurality of liquid permeable pouches having different lengths, the liquid permeable pouches stacked and arranged in alternating courses such that a course gap between two stacked liquid permeable pouches does not line up with the gap in an adjacent course of liquid permeable pouches.

The liquid permeable pouch may be formed substantially of a material having a maximum vertical wicking distance of about 0.3 inches per minute in a direction opposite a gravitational pull, and the liquid permeable pouch may be formed substantially of a material configured to maintain structural integrity through temperatures in the range of between about 5 degrees and about 200 degrees Celsius. In a further embodiment, the liquid permeable pouch is formed of a material configured to maintain structural integrity and contribute substantially no contaminates to the anhydrous hydride reactant during a reaction of the anhydrous hydride reactant.

The liquid permeable pouch, in one embodiment, comprises a material formed of a high percentage (at least 75%) polyester and low percentage (at most 25%) rayon which has some heat resistance. In another embodiment, the liquid permeable pouch comprises a material selected from the group consisting of a polymer material, a paper material, and a metal material. The liquid permeable pouch comprises a composite material comprising a combination of two of a polymer, paper, and metal in another embodiment.

In one embodiment, the liquid permeable pouch comprises a material that has a pore size below about 0.0025 inches, is chemically resistant in solutions between about pH 4 and about pH 13, and retains about 7.5 times the material's weight in water. Additionally, the liquid permeable pouch may comprise a pair of opposing walls joined by a pair of opposing longitudinal seams, the width of one wall between opposing longitudinal seams configured to maintain a thin uniform distribution of anhydrous hydride reactant within the cavity.

In one embodiment, the liquid permeable pouch has a width in the range of between about 0.25 inches and about 1.25 inches, and the permeation distance is selected in response to the liquid reactant permeability in the anhydrous hydride reactant. In a further embodiment, the permeation distance is about 0.25 inches. The apparatus also includes a liquid conduit configured to extend from a first end of the cartridge to a location near an opposing second end of the cartridge such that the cartridge is filled with the liquid reactant from the second end towards the first end. In another embodiment, a longitudinal axis of the cartridge is oriented in a vertical position. The longitudinal axis of the cartridge is oriented in a horizontal position in yet another embodiment.

The cartridge, in one embodiment, includes a first end, an opposing second end and an injection port located near the second end of the cartridge, such that the cartridge fills with the liquid reactant from the second end towards the first end. The apparatus may include a liner disposed on the interior of the cartridge, the liner configured to protect the interior of the cartridge from corrosion from the liquid reactant and anhydrous hydride reactant. In another embodiment, the apparatus includes a dry, powdered activating agent, the dry, powdered activating agent mixed with the solid, anhydrous hydride reactant to form a dry powder. In yet another embodiment, the cartridge has an internal pressure of about 30 psi.

The liquid permeable pouch provides for high energy density and efficient use of the anhydrous hydride reactant. Liquid reactant moved through the liquid conduit reacts with the anhydrous hydride reactant. The configuration of the liquid permeable pouch allows for a substantially complete reaction of the anhydrous hydride reactant in a controlled manner. Furthermore, the configuration of a plurality of liquid permeable pouch provides a consistent and uniform generation of hydrogen from the reaction of the anhydrous hydride reactant and the liquid reactant.

A system of the present invention is also presented. The system may include two rectangular sheets of liquid permeable material joined at their respective perimeters, the joined sheets having one or more seams that run from a long side of the sheets to an opposite long side of the sheets to form a plurality of liquid permeable containers. Each container has a cavity defined by opposite portions of the two sheets and the one or more seams. The cavity comprises a cross-section such that a point within the cross-section is separated from the sheets of the liquid permeable container by no more than double a permeation distance.

In one embodiment, an anhydrous hydride reactant may be disposed within the cavity of each liquid permeable container. The system also includes a cartridge configured to receive the liquid permeable containers and a liquid reactant such that at least a portion of the liquid permeable containers are submerged in the liquid reactant, the liquid permeable containers oriented substantially parallel to a longitudinal axis of the cartridge, and at least one liquid conduit extending into the cartridge. Each liquid permeable container may have a width between adjacent seams of about 0.75 inches, and the permeation distance is between 0.125 inches and 1 inch.

In a further embodiment, the plurality of liquid permeable containers is rolled from a short side of the sheets toward an opposite short side to form a spiral configuration. The longitudinal axis of the cartridge may be oriented in a vertical position in one embodiment. In another embodiment, the system includes a plurality of liquid conduits radially spaced in a spiral orientation about a longitudinal axis of the cartridge, each liquid conduit having a unique length. In yet another embodiment, the liquid permeable container distributes the liquid reactant by way of one of substantially woven strands and substantially of non-woven strands.

A method of the present invention is also presented. The method in the disclosed embodiments substantially includes the steps necessary to carry out the functions presented above with respect to the operation of the described apparatus and system. In one embodiment, the method includes joining two rectangular sheets of liquid permeable material at their respective perimeters, and forming one or more seals that extend from a long side of the sheets to an opposite long side to form a plurality of liquid permeable containers, each container having a cavity defined by opposite portions of the two sheets and at least one opening, each liquid permeable container having a cross-section configured such that a point within the cross-section is separated from a perimeter of the liquid permeable container by no more than double a permeation distance. The method also includes disposing an anhydrous hydride reactant within the cavity by way of the at least one opening, and sealing the at least one opening.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
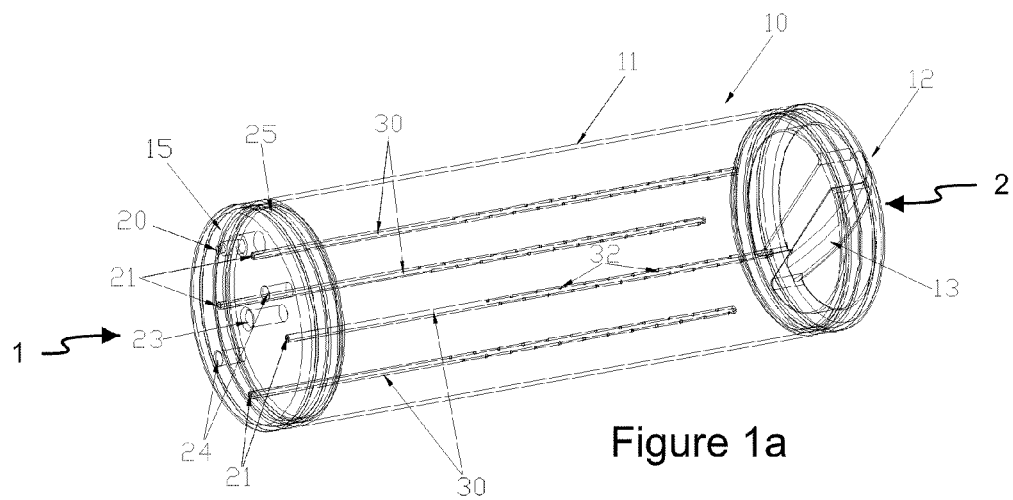
FIGS. 1a and 1b are perspective views of two embodiments of a hydrogen fuel cartridge suitable for use with the present invention.

FIG. 1A illustrates one embodiment of a hydrogen fuel cartridge which may be employed in the hydrogen generation system of the present invention. Fuel cartridge 10 may include a tubular body or housing 11, which in this embodiment ranges from 1 to 8 inches in diameter and 4 to 15 inches in length. Naturally, housing 11 is not limited to any particular cross-sectional shape or any particular dimensions. However, a tubular body or housing 11, as illustrated, works well for pressure tolerance. In one embodiment, housing 11 is formed of a material such as aluminum which has sufficient strength, is comparatively light, and has good heat transfer characteristics. However, many substitute materials will be readily apparent to those skilled in the art, including steel, stainless steel, carbon fiber epoxy composites, fiberglass epoxy composites, PEEK, polysulfone derivatives, polypropylene, PVC, or other suitable materials.

The housing 11 may include a first end 1 and an opposing second end 2. FIG. 1A's embodiment illustrates a rear end cap 12 at the opposing second end 2 of the housing 11 having a handle 13 allowing fuel cartridge 10 to be easily positioned and locked into place with other components of the overall hydrogen generation system as will be described below. In an alternate embodiment, the rear end cap 12 may be at the first end 1 of the housing 11.

Figures 2A, 2B:
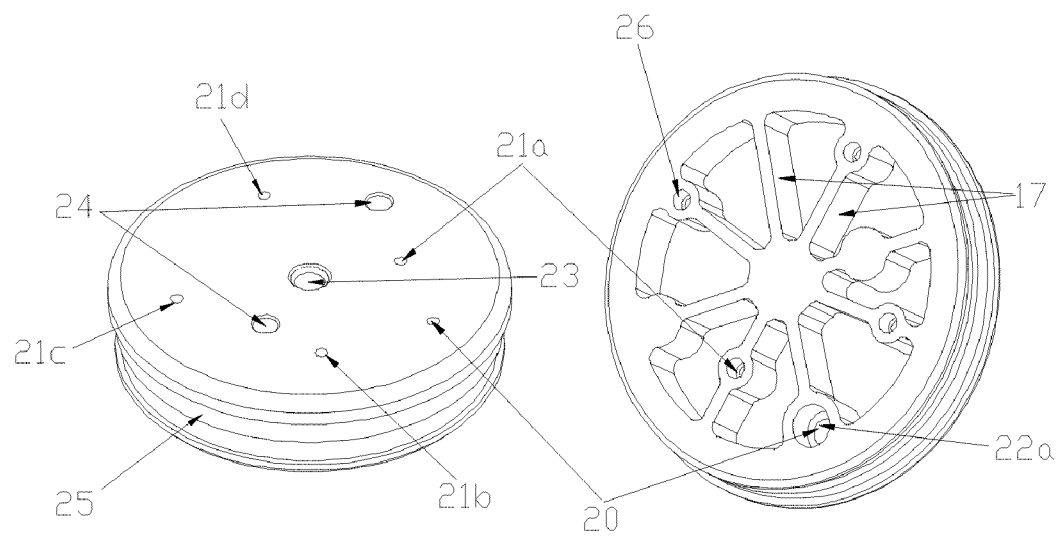
FIGS. 2a and 2b are perspective views of the front and rear of a front end cap of the fuel cartridge seen in FIGS. 1a and 1b.
Figure 4:
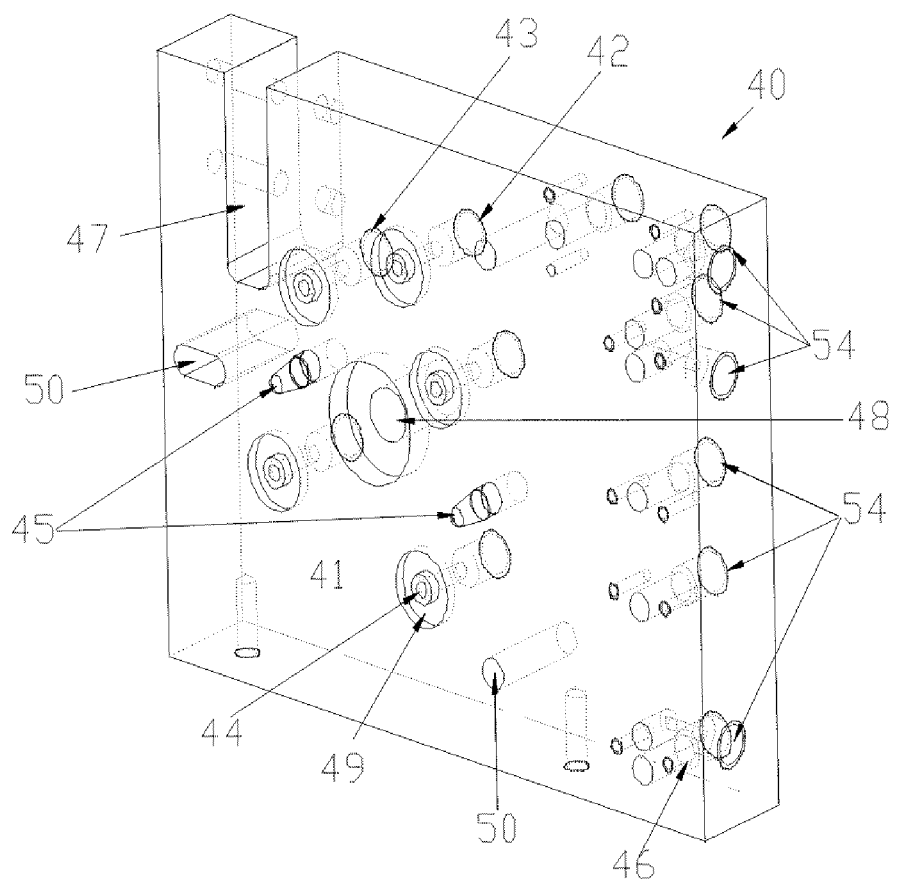
FIG. 4 illustrates one embodiment of the cartridge receiver plate.

The first end 1 of housing 11 opposite the opposing second end 2 and rear end cap 12 will comprise a front end cap 15 which is more clearly seen in FIGS. 2a and 2b. This embodiment of front end cap 15 will include a plurality of liquid reactant (e.g., water) inlet ports 21a-21d, a hydrogen gas outlet port 20, alignment structures 24 and a locking mechanism 23. In certain embodiments described herein, the liquid reactant may be water or another aqueous reactant (e.g., a water based acid solution). For simplicity, liquid reactant inlet ports 21 may be referred to as water inlet ports 21 when describing certain embodiments. In a certain embodiment, alignment structures 24 are circular apertures which engage a cartridge receiver or in one embodiment, the receiver plate 40 as seen in FIG. 4 (discussed below). In this embodiment, alignment structures 24 are non-symmetrically positioned around locking mechanism 23 to ensure end cap 15 can only engage receiver plate 40 in one orientation. Of course, other embodiments could include different numbers of water inlet ports 21 and hydrogen outlet ports 20, along with different types of alignment structures. In an alternate embodiment, the front end cap 15 may be at the second end 2 of the housing 11. In the illustrated embodiment, front end cap 15 will include a groove 25, which will allow end cap 15 to engage and be locked into housing 11 by way of the front end of housing 11 being crimped into the groove 25 (or by any other method forming a gas tight seal).

As best seen in FIG. 2a, the rear side of front end cap 15 will include a support assemblage 17 formed of structural elements having tube connectors 26 which secure liquid conduits or liquid reactant injection tubes 30 (see FIG. 1A) to front end cap 15 and provide continuous passages between injection tubes 30 and ports 21. In one embodiment, injection tubes 30 are fixed to end cap 15 in a manner which substantially prevents tubes 30 from moving relative to end cap 15 along an axis parallel to the length of cartridge housing 11. Another support assemblage 17 will provide space for a check valve cavity 22a (the rear side of hydrogen outlet port 20) to hold an integrated check valve 22 allowing gas flow only in the outward direction, i.e., from the interior to the exterior of cartridge 10. In one embodiment, the end cap is made of high temperature plastic, but one skilled in the art will see that end cap 15 could be made from a variety of materials, including aluminum, steel, stainless steel, plastics or composite materials. In the illustrated embodiment, the check valve may be a silicone duckbill type valve manufactured by Vernay Laboratories, Inc. of Yellow Springs, Ohio. As suggested in FIG. 1A, fluid injection tubes 30 will extend into the interior of cartridge housing 11 which holds a solid reactant (as explained in more detail below). In one embodiment, injection tubes 30 may extend into housing 11 at least half housing 11's length, although in other embodiments the injection tubes 30 may extend less than half the housing's length.

In one preferred embodiment, water injection tubes 30 will have an inside diameter ranging from about 0.5 to 5.0 mm with the inside diameter more preferably being about 1 mm. The injection tubes may be made of aluminum, brass, or other metal, PTFE, Nylon®, or other high temperature polymers. As suggested in FIG. 1A, a series of liquid distribution apertures 32 will be formed along the length of water injection tubes 30. In one embodiment, the liquid distribution apertures 32 will have a diameter which is no greater than about 1/5 the inside diameter of water injection tubes 30, and more preferably no greater than about 1/10 such inside diameter (e.g., on the order of about 50 to 1000 microns). Liquid distribution apertures 32 may be spaced in any manner to promote uniform liquid distribution, such as for example, every half inch on opposing sides of injection tubes 30. In certain embodiments, liquid distribution apertures may be spaced more closely along the length of tubes 30 as the tubes extend away from front end cap 15 in order to compensate for head loss in the fluid as it travels down the length of injection tube 30. Alternatively, the aperture size could be increased as the apertures become further from front end cap 15 in order to compensate for head loss.

Figure 1B:
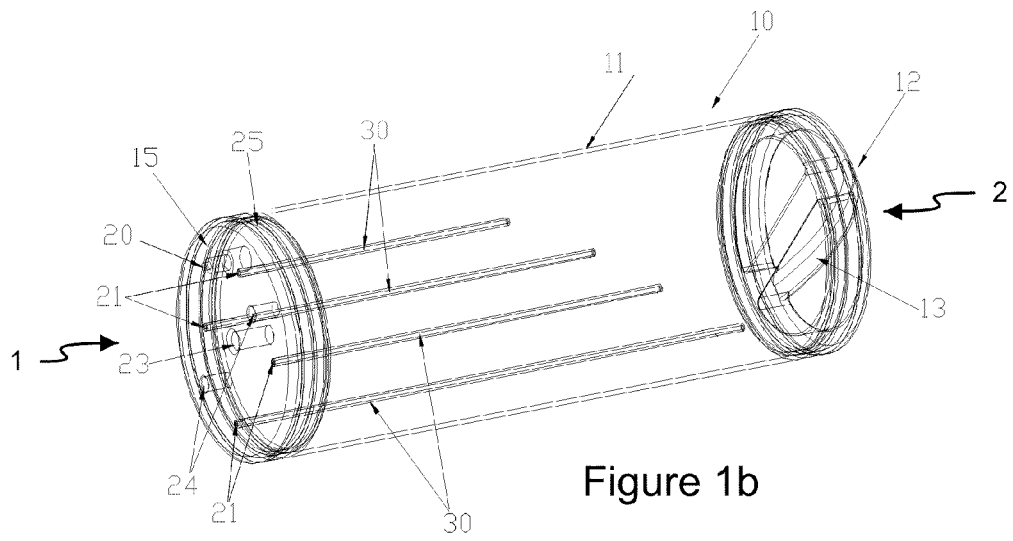

A further embodiment seen in FIG. 1B would eliminate the multiple apertures 32 along the length of the tubes and have only one injection aperture 32 at the open end of the tubes (although this single aperture could be elsewhere along the length of the tubes). The length of the different tubes 30 could vary from the end cap 15 in order to distribute liquid reactant throughout the housing. The above described alternative embodiments along with other unspecified alternative embodiments may be employed to distribute liquid reactant at different locations within housing 11. For example, in one embodiment, the first end 1 of the housing 11 may be located at a side of the housing 11 rather than at the location of the rear end cap 12 or the front end cap 15. In this embodiment, the water injection tubes 30 may enter the housing 11 from one side at the first end 1 of the housing 11 and extend to an opposing side of the housing 11.

As suggested above, one embodiment of fuel cartridge 10 will contain a solid reactant such as an anhydrous chemical hydride. In certain embodiments, a chemical hydride may be considered a reducing compound containing a metal and hydrogen that generates hydrogen gas when it reacts with water or other oxidizing agents. Various examples of chemical hydrides are disclosed in U.S. application Ser. No. 10/459,991 filed Jun. 11, 2003 which is incorporated by reference herein. Nonlimiting examples of chemical hydrides may include sodium borohydride, lithium borohydride, lithium aluminum hydride, lithium hydride, sodium hydride, and calcium hydride.

Figure 3A:
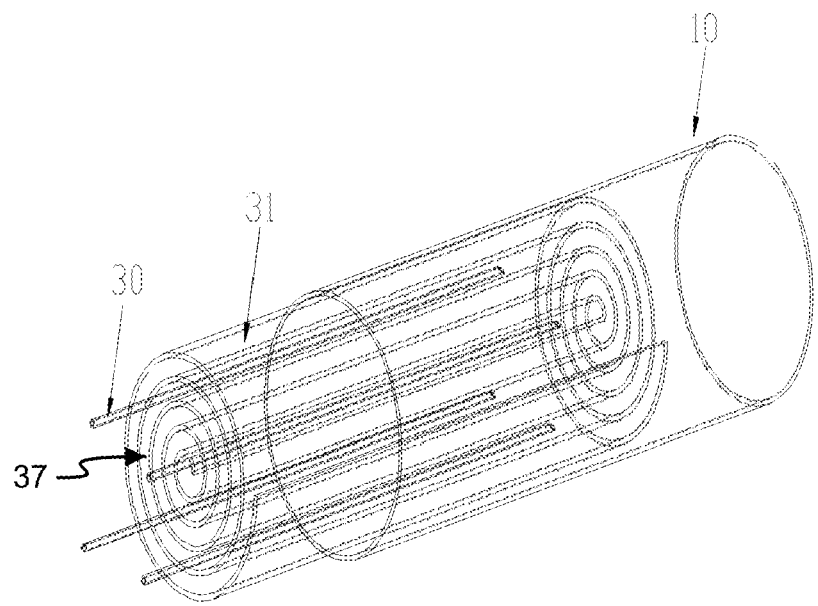
FIG. 3a illustrates a spirally wrapped chemical hydride pouch utilized in one embodiment of the present invention.

In the embodiment seen in FIG. 3a, the chemical hydride reactant will be enclosed within a fabric pouch 31. As used herein, "fabric" includes not only textile materials, but also includes porous materials typically used for filtration purposes, including advanced composite materials. One embodiment of the fabric will be a porous material which can maintain structural integrity at temperatures ranging from about 5° C. to about 200° C., a pH ranging from about 4 to about 13, and which exhibits at least some wicking potential. Preferred fabrics may include woven or nonwoven Nylon, Rayon, polyester, or a blend of these materials (for example Crane 57-30 manufactured by Crane Nonwovens of Dalton, Mass., or Pellon 30 manufactured by Pellon Consumer Products of Tucker, Ga.), 100% polyester or porous filter paper such as Paper 602 provided by National Filter Media Corporation, Salt Lake City, Utah. The wicking potential may be measured in distance water wicks divided by time. Illustrative examples include paper 603—6" in 60 min., Pellon 30—1.8" in 60 min., Nylon—1.2" in 60 min., coffee filter paper—2.3" in 60 min. In certain embodiments, a wicking potential of between 0.1 and 1 inch a minute may be employed. In one embodiment, the thickness of the fabric or paper could be in the range of between about 3 mils to 12 mils, while the pore size of the fabric or paper could be between at least 1 micron and about 50 microns. Naturally, the present invention may include wicking potentials, fabric thicknesses, and pore sizes different from those listed above.

In the embodiment of FIG. 3a, the fabric pouch 31 defines a comparatively thin cavity having a substantially greater area than thickness. Pouch 31 may be formed in any conventional manner. For example, viewing FIG. 3b, it can be seen how two rectangular sheets of fabric material 33a and 33b may be sealed along three edges (for example by stitching 34) and segmented into 0.25 to 1.25 inch wide sections 36 (also by stitching) to leave open ends 35. The series of sections 36 thus formed are filled with a fine grain chemical hydride (described below) and sealed along the fourth edge by stitching closed open ends 35. An illustrative thickness of such a pouch 31 (i.e., the average thickness of sections 36 when unrolled lying flat and charged with a chemical hydride) may be approximately ¼ of an inch in one embodiment and its unrolled dimensions could be approximately 5.75 inches wide by 50 inches long.

Then the pouch 31 is rolled to a diameter sufficiently small to be inserted into tubular housing 11 as suggested in FIG. 3a (the front end cap 15 has been removed for purposes of clarity). "Rolled" as used herein means any arrangement of the pouch 31 such that the pouch may be inserted into the tubular housing 11. For example, the pouch 31 may be rolled into a spiral configuration as shown in FIG. 3a. In another embodiment, rolling the pouch 31 may comprise arranging the pouch 31 with multiple folds into a single or repeating "s" shape when viewed along a longitudinal axis. In a further example, rolling the pouch 31 may comprise bunching the pouch 31 in a random or semi-random manner such that the pouch 31 fits in the tubular housing 11.

Rolling the pouch 31 creates liquid channels 37 between adjacent portions of the rolled pouch 31 through which liquid may flow and surround the pouch 31 and sections 34 of the pouch 31. In one embodiment, water flows through the liquid channels 37 to surround sections 34 of the pouch 31 and permeates through the material of the pouch 31 to reach the reactant inside the sections 34 of the pouch 31. The liquid channels 37 direct the flow of liquid around the rolled pouch 31.

The water injection tubes 30 are then carefully inserted between overlapping layers of the rolled pouch 31. FIGS. 1a and 2a illustrate how in one embodiment, water ports 21 (and thus injection tubes 30) may be arranged in a nonuniform configuration such as a spiral pattern. For example, water port 21a in FIG. 2a is closest to the center point of end cap 15. Then water port 21b is radially spaced further from the center point, with water port 21c spaced even further and water port 21d spaced still further. In this manner, water injection tubes 30 may follow the spiral pattern of rolled pouch 31. However, other embodiments may utilize different orientations of pouch 31 or may use a series of smaller pouches 31 as opposed to the continuous pouch 31 seen in FIG. 3b and may use various arrangements of injection tubes 30. In one embodiment, the components (pouch and tubes) within cartridge 10 will have a temperature stability between at least about 5° C. to at least about 200° C. and a corrosion stability/resistance at pHs ranging from about 4 to about 13.

Figure 7:
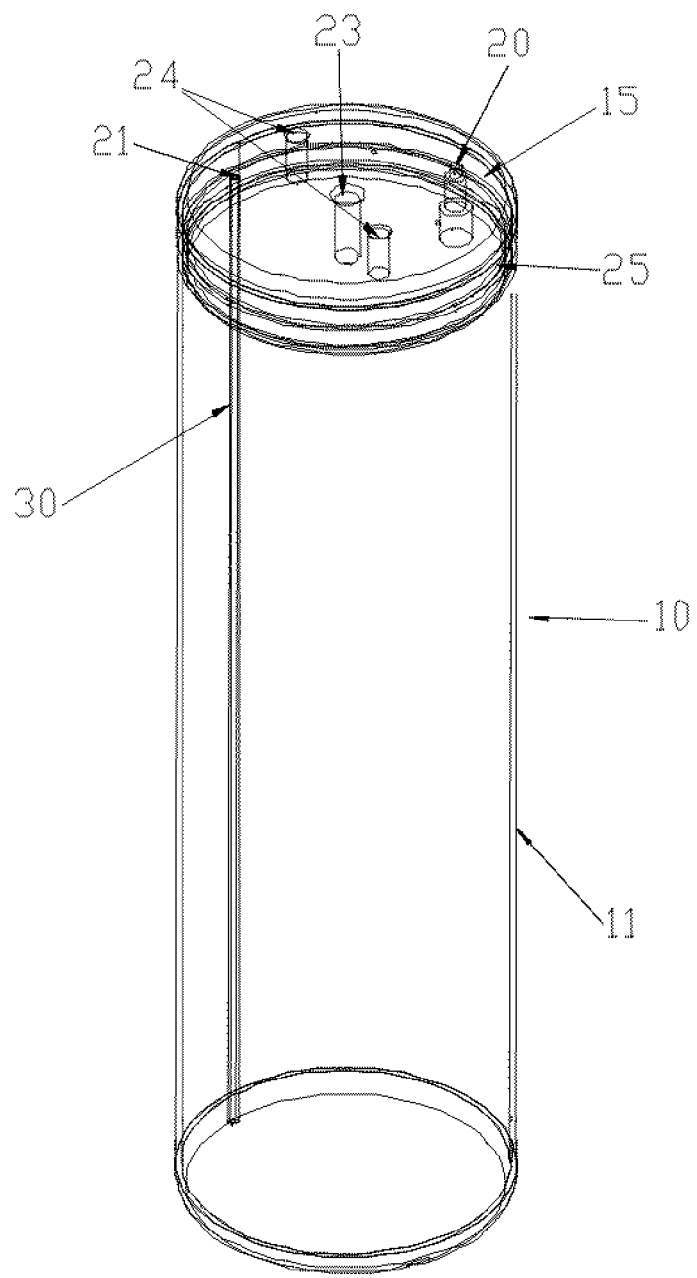
FIG. 7 is a schematic block diagram illustrating one embodiment of a pouch 1400 in accordance with the present invention.

A still further embodiment of cartridge 10 is seen in FIG. 7. In this embodiment the end cap 15 is similar to that described above. However, a single injection tube 30 extends into housing 11 toward the bottom of the cartridge 10. The injection tube 30 will have an aperture at the end of the tube. The cartridge 10 may be oriented vertically such that water injected into the cartridge 10 will react first with the hydride material at the bottom. As additional water is injected, the water will rise and activate hydride material along the length of cartridge 10. In other variations, the cartridge 10 may be in non-vertical orientations. The chemical hydride material is preferably in a pouch (e.g., FIG. 5) which is inserted in cartridge 10 or any other manner of (or container for) positioning the hydride material in cartridge 10 such that the liquid can effectively be brought into contact with the hydride material.

Figure 5:
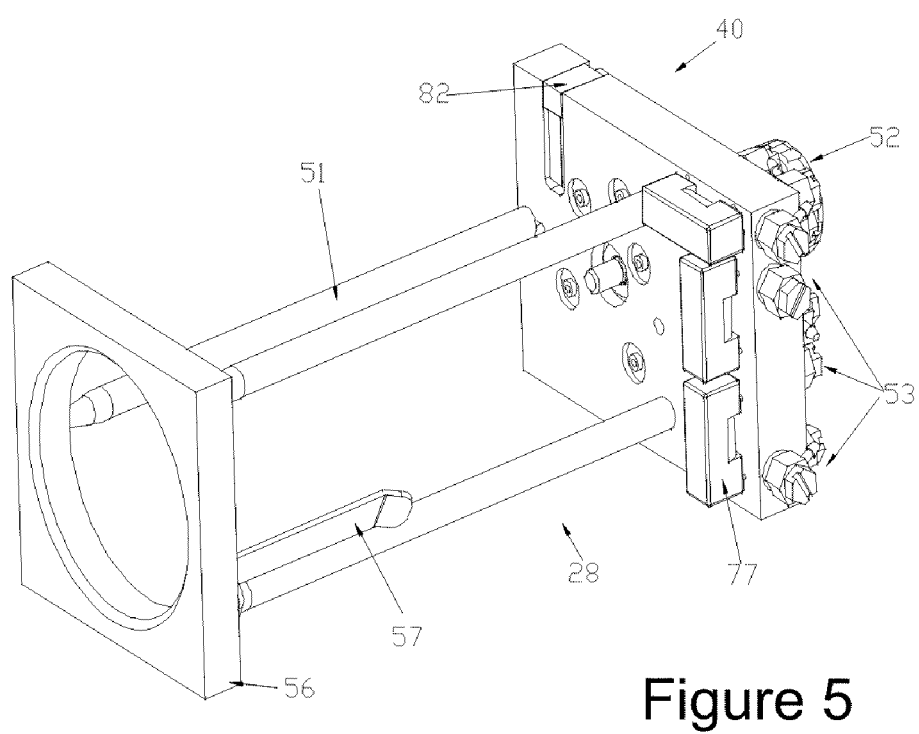
FIG. 5 illustrates one embodiment of the receiver assembly.

FIG. 4 illustrates one embodiment of receiver plate 40. Receiver plate 40 will include a receiver body 41 which has various structures formed thereon and within for mating with end cap 15 of cartridge 10. Within the receiver body 41 are alignment structures or guide pins 45 which will mate with alignment structures 24 on end cap 15. Alternatively, the receiver plate 40 and receiver body 41 may be configured in such a way that alignment structures or guide pins 45 are not required. Additionally, receiver plate 40 includes a plurality of port connectors 44 which will mate with hydrogen and water ports 20 and 21 on end cap 15. Indentions 49 around port connectors 44 will accommodate sealing devices such as O-rings or gaskets. A port connector 44 will communicate with each hydrogen passage 42 and water passages 43 which is formed through receiver body 41. It will be understood that external water and hydrogen lines (see schematic in FIG. 6) will connect (directly or indirectly depending on the embodiment) to hydrogen passage 42 and water passages 43 and thereby provide fluid communication through receiver plate 40 to the hydrogen port 20 and water ports 21 of cartridge 10. FIG. 4 illustrates how one embodiment of receiver plate 40 will include internal water passages 46 and various inlets and outlets 54 for passages 46. FIG. 5 illustrates how the openings in water passages 46 will communicate with electronic control valves 77 and hose fittings 53. In the embodiment shown, hose fittings 53 are 90 degree, ⅛ inch I.D. hose barb fittings supplied by Clippard Instruments Laboratory, Inc. of Cincinnati, Ohio and control valves 77 are x-valves available from Parker Hannifan Corporation located in Cleveland Ohio.

In one embodiment, a plurality of hoses (not shown) will connect the plurality of water passages 46 (via hose fittings 53) in the receiver plate 40 to water passages 43, likewise equipped with hose fittings. In other embodiments, the passages 46 may connect directly to passages 43 through the internal volume of receiver plate 40, but forming long internal passages within receiver plate 40 adds substantial manufacturing complexity.

The receiver plate 40 seen in FIG. 4 will connect to end cap 15 (see FIG. 2a) by way of a holding assembly, one example of which is a bolt or other threaded member passing through aperture 48 in receiver plate 40 and engaging the threaded inner surface of locking mechanism 23 on end cap 15 in order to pull end cap 15 firmly against receiver plate 40 and form seals between hydrogen/water ports 20/21 and port connectors 44. FIG. 5 shows the complete receiver assembly 28 including support plate 56 and connecting rods 51 engaging rod apertures 50 in receiver plate 40. In the embodiment shown, one rod aperture 50 will be elongated and the others round to assist in orienting the rods 51 for insertion into receiver plate 40. The cartridge 10 slides through the opening in support plate 56 and in between the connecting rods 51 and seals against the receiver plate 40 as described previously with the threaded end of knob 52 extending through aperture 48. A mounting arm 57 will extend from support plate 56 and rest against cartridge 10. A cartridge temperature sensor described herein will be attached to mounting arm 57. In the embodiment of FIG. 5, the electronic valves 77 are shown connected to the receiver plate 40. Slot 47 in the receiver plate 40 shown in FIG. 4 firmly holds the cartridge sense switch 82 as shown in FIG. 5. In one embodiment, cartridge sense switch 82 is ZM series microswitch with lever manufactured by Honeywell International, Inc. of Morristown, N.J. and will detect when cartridge 10 is in direct or near contact with sense switch 82.

In one embodiment of the present invention, the chemical hydride reactant utilized in the fuel cartridge may be a dry, powdered form of sodium borohydride ($NaBH_4$) mixed with an activating agent. The $NaBH_4$ is particularly suitable for use in the pouch 31 seen in FIG. 3a and in one embodiment; the $NaBH_4$ will have a grain size ranging from about mesh 10 to about mesh 1000. It is preferred that the activating agent be a dry, powdered solid when mixed with $NaBH_4$, since solids tend to react very slowly with each other. However, in alternative embodiments, the activating agent could also be mixed into an organic/oil solvent. In addition, the activating agent in certain embodiments is preferably water soluble to increase its effectiveness, since the greater its solubility, the greater its potential to activate the water/$NaBH_4$ reaction.

One effective activating material is magnesium chloride ($MgCl_2$), since it is relatively lightweight, low cost, and strongly activating. Other potential activating agents are other salts of Group IIA (alkaline earth metals), or Group IIIA with Group VIIA (halides), such as $AlCl_3$, $BeF_2$, $BeCl_2$, $BeBr_2$, $BeI_2$, $MgF_2$, $MgBr_2$, $Mg_2I$, $CaF_2$, $CaCl_2$, $CaBr_2$, and $CaI_2$. The fluorides and chlorides are preferred because they have a lower molecular weight. However, some of these salts may be less preferred depending on their degree of solubility in water or if they are considered toxic (e.g., beryllium compounds).

Activating agents may also include other water soluble salts such as Group IA (alkali metals) salts including LiF, LiCl, LiBr, LiI, NaF, NaCl, NaBr, NaI, KF, KCl, KBr, and KI. Group IA and Group IIA hydroxides may be less preferred, since they make basic solutions in water and thus reduce the reaction rate. Group IA and Group IIA oxides may also be less preferred since they tend to be more stable and thus not as reactive. However, Group IA and Group IIA sulfides, sulfates, and selenides, such as $Li_2S$, $Li_2Se$, $Mg(SO_4)_2$ may be better activating agents if they are sufficiently water soluble. In one preferred embodiment, the activating agents will be from the group of $MgCl_2$, $BeCl_2$, LiCl, NaCl, or KCl. However, any of the above activating agents may be employed given the proper design and use conditions. In certain embodiments, the activating agent will have a grain size ranging from about mesh 10 to about mesh 1000.

In one preferred embodiment, the quantity of activating agent mixed with the chemical hydride will be from about 10 weight percent to about 65 weight percent and more preferably about 50 weight percent to about 60 weight percent. In one embodiment, the quantity of activating agent is 55 weight percent. In the embodiment where the solid reactant is 55 weight percent $MgCl_2$, approximately 0.8 gm of water will be required to fully react each gm of solid reactant. One consideration in optimizing the amount of activating agent is determining the minimum amount of the material which gives the desired hydrogen generation rate and results in complete reaction/utilization of the $NaBH_4$. For a 55 weight % $MgCl_2$/$NaBH_4$ mixture, the energy density is 3116 Whr/kg. For comparison, the energy density of a 20 weight % $NaBH_4$/$H_2O$ mixture (i.e., $NaBH_4$ dissolved in water) is 1066 Whr/kg, while the energy density for $NaBH_4$ alone is 7101 Whr/kg.

An alternative activating agent may be an anhydrous or powdered acid such as boric acid ($H_3BO_3$), oxalic acid, tartaric acid, citric acid, etc. Such anhydrous acids can be mixed with the $NaBH_4$ without reaction, but when water is added, the anhydrous acid dissolves and thus causes a reaction. Weak or relatively insoluble anhydrous acids such as boric acid when mixed with $NaBH_4$ produce hydrogen in the presence of water at a relatively low rate, and thus are less preferred. Strong acids such as oxalic acid are very soluble in water and generate substantial hydrogen when mixed with $NaBH_4$. However, this mixture is difficult to control and is also less preferred. However, intermediate strength acids, such as tartaric acid or citric acid are more favorable. In one preferred embodiment, the strength (Ka) of the dry acid will range from about $1\times10^{-4}$ to about $1\times10^{-11}$. In certain embodiments, the powdered acid will have a grain size ranging from about mesh 10 to about mesh 1000. In one preferred embodiment, the quantity of tartaric acid mixed with $NaBH_4$ will be from about 5 to about 50 weight percent and more preferably about 8 to about 12 weight percent. In this embodiment, approximately 0.8 gm of water will be required to fully react each gram of solid reactant.

As a further alternative, an inexpensive, water-insoluble catalyst may be mixed with the $NaBH_4$. The catalyst can act to accelerate the water/$NaBH_4$ reaction as water is injected. Such metal catalyst could include Co, Ni, Cu, Pt, Pd, Fe, Ru, Mn, and Cr. Typically, the metal catalyst will be in a powder form (e.g., particles less than 25 um) and will be added to the chemical hydride in an amount of about 25 weight percent to about 65 weight percent. In this embodiment, approximately 0.8 gm of water will be required to fully react each gram of solid reactant.

A still further alternative to mixing an anhydrous activating agent with the $NaBH_4$ may be to mix the water soluble activating agent in with the water before it is injected into the cartridge containing anhydrous $NaBH_4$ or other metal hydride. This has the advantage that an aqueous substance such as hydrochloric acid (HCl) may be used. In this embodiment, the activating material is held in separate container or reservoir 60 such as seen in FIG. 2. This container may be attached to the cartridge housing 11 but could be detached in other embodiments.

Although $NaBH_4$ is mainly discussed above, alternative chemical hydrides may include (but are not limited to) lithium borohydride, lithium aluminum hydride, lithium hydride, sodium hydride, and calcium hydride. In certain embodiments, these latter chemical hydrides need not be combined with a powdered activating agent as described above and may be activated with water alone.

Fuel cartridges such as those described above will typically be employed in a hydrogen generation system. One embodiment of such a hydrogen generation system is shown schematically in FIG. 6. This hydrogen generation system 1 will generally comprise a fuel cartridge 10 connected to receiver plate 40 with a liquid reactant (e.g., water) line 79 supplying water to fuel cartridge 10. A water pump 78 controlled by control system 75 will provide a carefully metered amount of water to fuel cartridge 10. In one preferred embodiment, control system 75 consists of a micro-processor and related control circuitry such as a PIC microcontroller 16F877A. Control system 75 will also operate cooling fans 81, switching valves 77, and transfer valve 84. Moreover, control system 75 will receive data on system parameters from temperature sensor 80, cartridge sensor 82, and hydrogen pressure sensor 89. In one embodiment, temperature sensor 80 is mounted against the external skin of aluminum housing 11. To prevent hydrogen from escaping from the system when the cartridge is removed, a check valve 87 is incorporated into the hydrogen line between the receiver plate and the hydrogen trap 83.

Hydrogen gas exiting cartridge 10 will flow through a check valve 87 and a hydrogen filter/water trap 83 before being directed to a fuel cell or other device to which hydrogen is to be supplied. Filter/water trap 83 serves the dual purpose of filtering particulate out of the hydrogen and also removing excess moisture from the hydrogen gas. A water condenser/reservoir 85 will collect water from any moist air returned from the fuel cell or other hydrogen consuming device and will also store water collected from water trap 83 and transferred via transfer valve 84.

In operation, control system 75 will determine the volume of water to pump into fuel cartridge 10 based upon monitoring parameters such as the temperature of the chemical hydride (as indicated by temperature sensor 80) and the hydrogen pressure within the system as measured by pressure sensor 89. As hydrogen pressure drops below a predetermined level in system 1, water pump 78 will be activated to deliver water to fuel cartridge 10, thereby causing the chemical hydride in cartridge 10 to release additional hydrogen gas. The release of additional hydrogen gas will result in an increase of pressure in the system 1. In one embodiment, the fuel cartridge has an internal pressure that is maintained at a relative pressure above ambient of about 30 psi. The system 1 may maintain a pressure within a fuel cell of about 7 psi.

In one preferred embodiment, switching valves 77 will be individually controlled by control system 75 as described above. This allows pump 78 to deliver water through only one water injection tube 30 at a time and to sequentially deliver water to each injection tube 30. This sequential method of delivering water may in some instances provide a more uniform distribution of water than if all water injection tubes were simply manifolded together without individual control of water flow to each injection tube 30. Likewise, the temperature sensor 80 monitoring the temperature of the chemical hydride will allow control system 75 to make decisions regarding whether fans 81 should be turned on to cool cartridge 10 or whether water should be limited to slow down the reaction rate of the chemical hydride. Hydrogen generation system 1 may also include the cartridge sensor 82 which will signal control system 75 as to whether a fuel cartridge 10 is presently installed in the system and will also provide control system 75 with information concerning when a spent cartridge has been removed and a new, fully charged cartridge installed.

In another embodiment, a single injection tube 30 is used and the liquid reactant fills a vertical cartridge from the bottom up.

As hydrogen gas flows through filter/water trap 83, excess moisture in the hydrogen gas will be removed and when a sufficient amount of water has accumulated, will be transferred via transfer valve 84 to water condenser/reservoir 85. Hydrogen gas exiting filter/water trap 83 will be directed through line 90 to the particular hydrogen consuming device, which for illustrative purposes will be considered a fuel cell in the present description. Typically, a regulator 88 will be positioned in line 90 to assure the fuel cell is supplied with hydrogen at a constant pressure. If the hydrogen consuming device produces water vapor as a by-product (as do fuel cells), the moist air will be directed via line 86 back to condenser 85 and the water recovered from the air. Likewise, water vapor in the hydrogen passing through purge line 91 (another characteristic feature of fuel cells) will be recovered in condenser 85.

Figure 6:
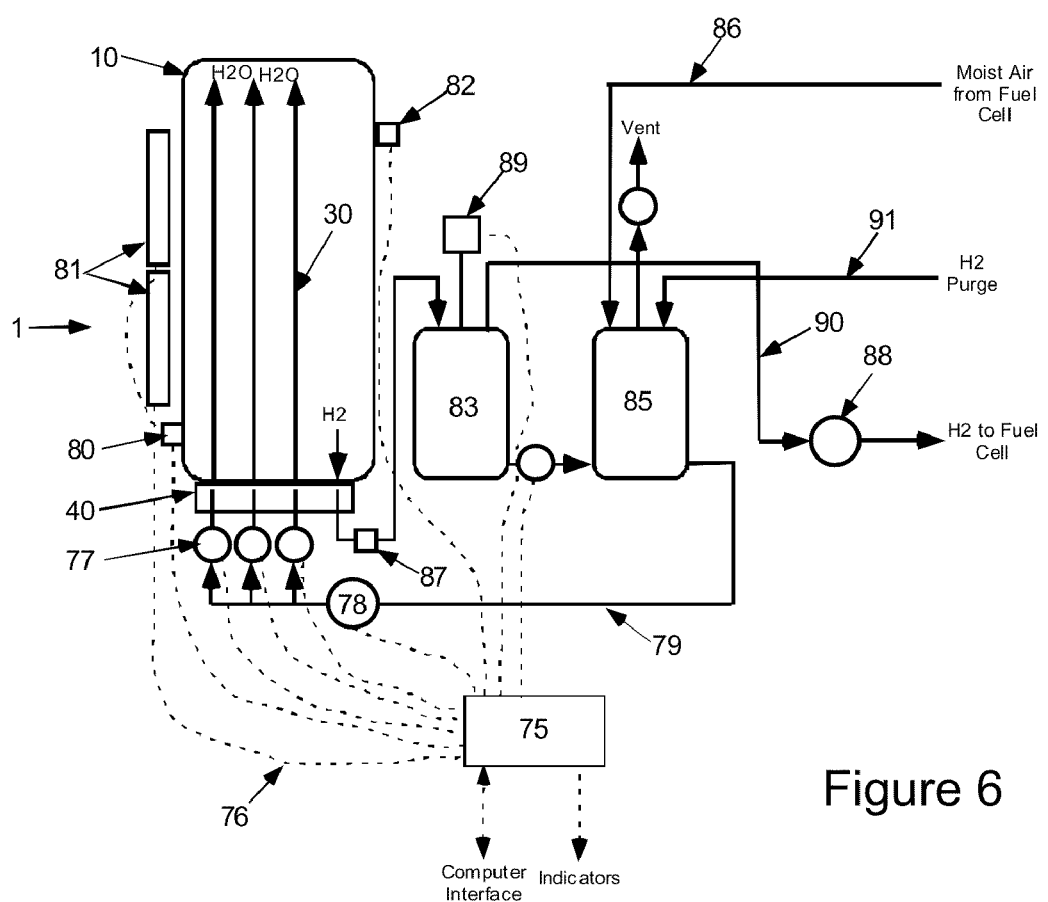
FIG. 6 is a schematic diagram of one embodiment of the hydrogen generation system of the present invention.

In another embodiment of the present invention, the injection switching valves 77 seen in FIG. 6 can be replaced with a manifold. In this case, fluid from the injection pump 78 is split equally between the multiple injection tubes 30 which are connected in parallel. Parallel injection tubes are preferably very uniform with tight tolerances so that the pressure drop along the length of each injection tube is the same.

Figure 8:
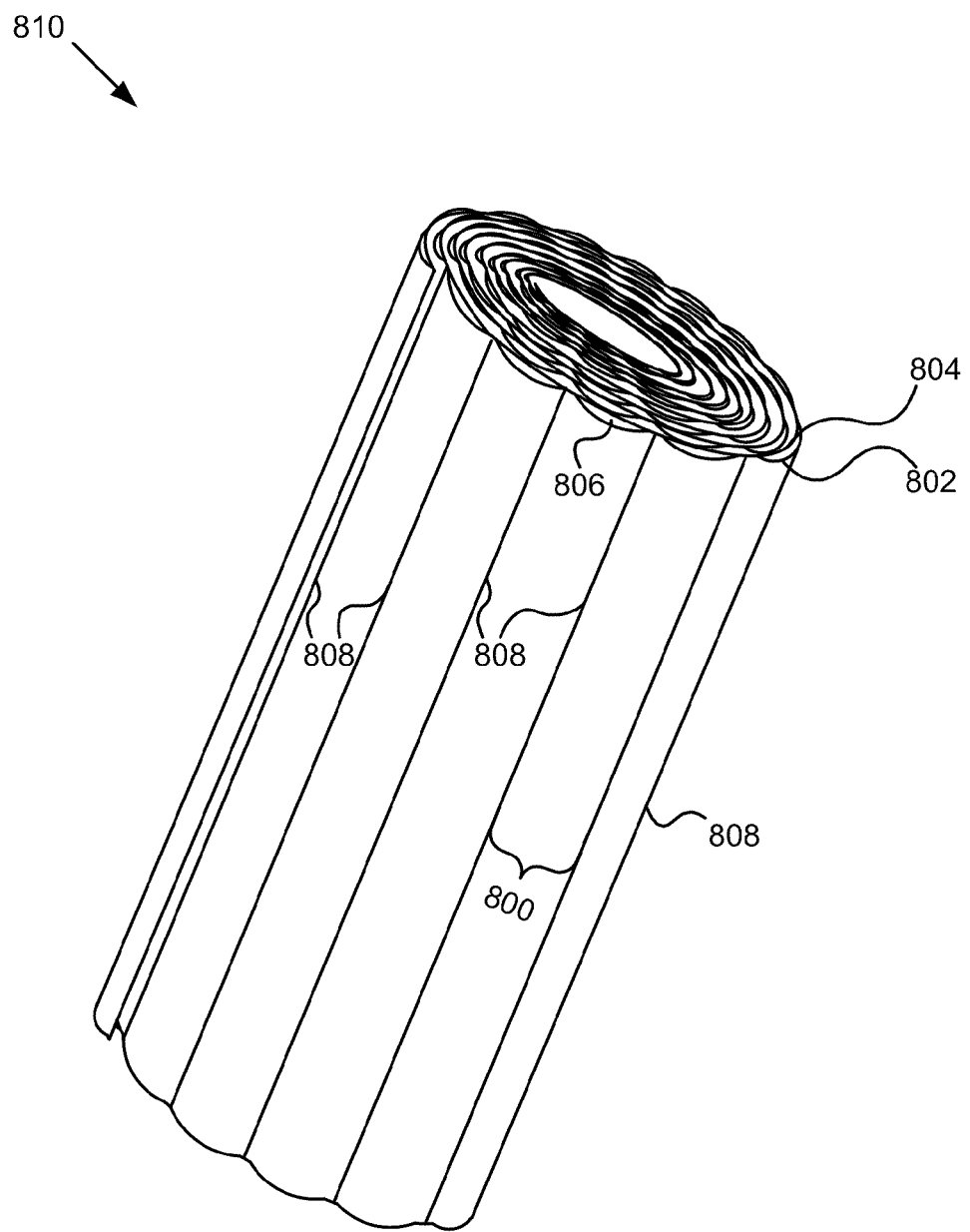
FIG. 8 is a diagram illustrating a top view of a cartridge in accordance with the present invention.

FIG. 8 is a perspective view diagram illustrating one embodiment of a pouch 800 in accordance with the present invention. In one embodiment, the chemical hydride reactant is enclosed within a water permeable material, or fabric pouch 800. As used herein, "fabric" includes not only textile materials, but also includes paper, polymeric, or metal based porous materials that may be used for filtration purposes, or a composite material comprising a combination of paper, polymeric, and/or metal based porous materials. One embodiment of the fabric comprises a porous material which can maintain structural integrity at temperatures ranging from about −5° C. to about 200° C., and a pH ranging from about 4 to about 13.

Suitable fabrics may include but are not limited to woven or nonwoven Nylon, Rayon, polyester, porous filter paper, or blends of these materials. In one embodiment, the material for the pouch 800 may be selected for optimal thickness, density, and water retention. In one embodiment, the cartridge (of FIGS. 1*a* and 1*b*) is in a vertical configuration and the pouch 800 comprises a material with minimal water retention, the material retains water such that the weight of the water retained is less than about 10 times the weight of the material itself. The material may also include little or no wicking capabilities. In a further embodiment, the cartridge is in a horizontal configuration with a longitudinal axis in a horizontal orientation and a material is selected with a greater water retention ability and some wicking ability. In certain embodiments it is desirable to control the wicking in order to better control the reaction rate of the chemical hydride reactant. The ability to limit wicking allows for better reaction rate control, thereby preventing localized heating of the hydride which may cause decomposition of the material.

The water retention and wicking potential of the pouch 800 affect where the chemical reaction between the water and the chemical hydride occurs. Low water retention and wicking potential helps keep the chemical reaction at or below a water fill level in the cartridge. If the water retention and wicking potential are higher, the pouch 800 wicks and retains the water such that the chemical reaction can occur above the fill level of the cartridge. Selection of a material for the pouch 800 may be based on the configuration of the cartridge, the injection tubes, and the chemical hydride and activating agent in use, in order to more precisely control the chemical reaction within the cartridge.

Other relevant factors may include water permeability, porosity, chemical reactivity, and temperature stability between about 5° C. and about 200° C. relative to the chemical hydride, activating agent, and water injection system in use. A suitable thickness for the material for the pouch is between about 3 mils (0.003 inches) and 12 mils (0.012 inches). A suitable density is less than about 0.05 grams per square inch.

In one exemplary embodiment, the pouch 800 comprises Crane® 57-30, a product of Crane Nonwovens of Dalton, Mass. Crane® 57-30 has a thickness of about 0.0043 inches, has a density of about 57.9 grams per square meter, is water permeable, has a pore size below about 0.0025 inches, is chemically resistant in basic and acidic solutions of about pH 4 to about pH 13, is stable in temperatures up to about 180° C., and retains only about 7.5 times its own weight in water. Other combinations of material properties such as thickness, density, and water retention that are configured for stable hydrogen generation may also be used.

In one embodiment, the fabric pouch 800 is comparatively thin having a substantially greater width than thickness. The pouch 800 may be formed in any conventional manner. For example, two rectangular sheets of fabric material 802 and 804 may be sealed along three edges (for example by stitching or other sealing methods) and segmented into 0.25 to 1.25 inch wide sections to leave open ends 806 (See also FIG. 3*b*). The series of sections or pouches 800 may then be filled with a fine grain chemical hydride and sealed along the fourth edge.

An illustrative width of the pouch 1400 (i.e., the distance between sealed edges 808 of sections when unrolled and charged with a chemical hydride) may be in the range of between about 0.25 and 1.25 inches. The plurality of pouches 800, in one embodiment may be rolled in a spiral configuration, as illustrated, in order to be inserted in to a tubular housing or cartridge. Alternatively, the pouches may in any configuration that promotes water channel distribution. The dimensions of the plurality of liquid permeable pouches 800 (hereinafter rolled pouch 810) may be determined based on the size of the cartridge, and the configuration of the pouch 800.

The water injection tubes may be inserted between layers of the rolled pouch 810. In one embodiment, the cartridge may be implemented in a vertical configuration in order to eliminate the need for injection tubes, as gravity will pull the liquid to the bottom of the cartridge and begin submerging the pouches and subsequently the anhydrous hydride. In another embodiment, a single injection tube receives injected liquid reactant and delivers the liquid reactant to the bottom of a vertical cartridge.

In one embodiment, a liner (not shown) is also disposed between the cartridge and the rolled pouch 810 in order to protect the cartridge from corrosion and damage. The liner may be removable or permanent, and may serve to extend the life of the cartridge. In one embodiment, the liner is a bag or pouch consisting of a plastic or other inert material known in the art, and the liner is configured to withstand the temperatures associated with a hydrogen generating chemical hydride reaction. One example of a liner is a polypropylene liner produced by Bradley Bags of Downey, Calif. Preferably, the liner is sized to be just smaller than the interior of the cartridge.

Figure 9:
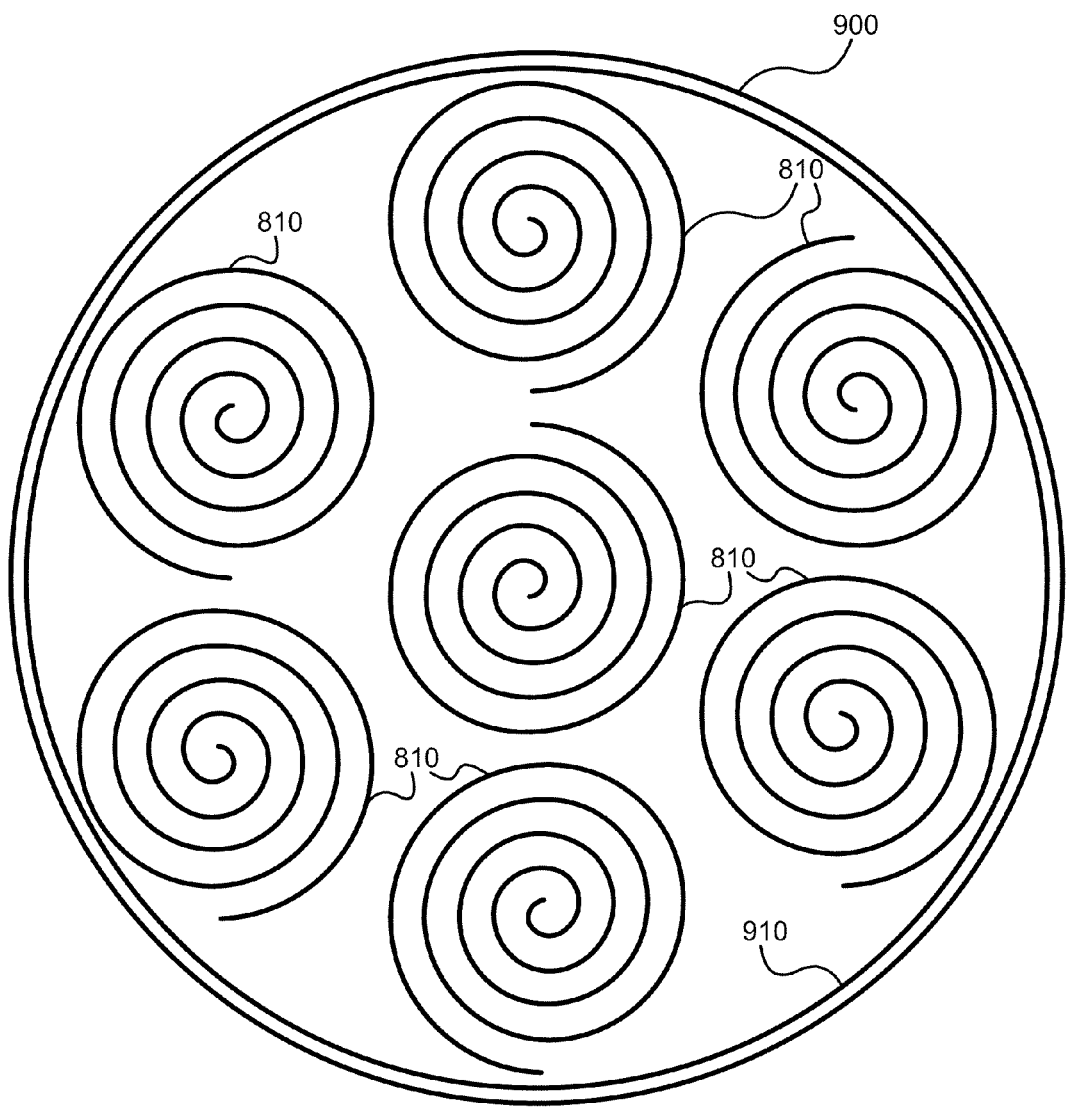
FIG. 9 is a block diagram illustrating a side cross-section view of one embodiment of the cartridge in accordance with the present invention.

FIG. 9 is a diagram illustrating a top view of a cartridge 900 in accordance with the present invention. In one embodiment, the cartridge 900 comprises multiple rolled pouches 810 and a liner 910. The cartridge, as depicted, may be formed having a substantially circular cross section corresponding to the generally tubular configuration depicted in FIGS. 1*a*-3*a*. Alternatively, the cartridge may be formed having other geometric shapes including, but not limited to, ovals, squares, rectangles, and other polygonal shapes. The cartridge 900 may be configured with a number of rolled pouches 810 selected to produce a desired amount of hydrogen.

In one embodiment, the cartridge 900 is configured with 7 rolled pouches 810, as depicted, in an arrangement selected to maximize pouch density and therefore chemical hydride density. Of course the depicted embodiment is given by way of example only and the number of rolled pouches 810 may be increased or decreased depending upon the hydrogen requirements and dimensions of the system.

The liner 910, in one embodiment, is disposed between the cartridge 900 and the rolled pouches 810 in order to protect the cartridge 900 from corrosion and damage. The liner 910 may be removable or permanent, and may serve to extend the life of the cartridge 900. In one embodiment, the liner 910 is a bag or pouch consisting of a plastic or other inert material known in the art, and the liner 910 is configured to withstand the temperatures associated with a hydrogen generating chemical hydride reaction. One example of a liner 910 is a polypropylene liner produced by Bradley Bags of Downey, Calif. Preferably, the liner 910 is sized to be just smaller than the interior of the cartridge 900. As will be appreciated by one skilled in the art, the liner 910 may be in any configuration capable of protecting the cartridge 900 from corrosion, and may be employed when using multiple pouches 810 or a single pouch 810.

Figure 10:
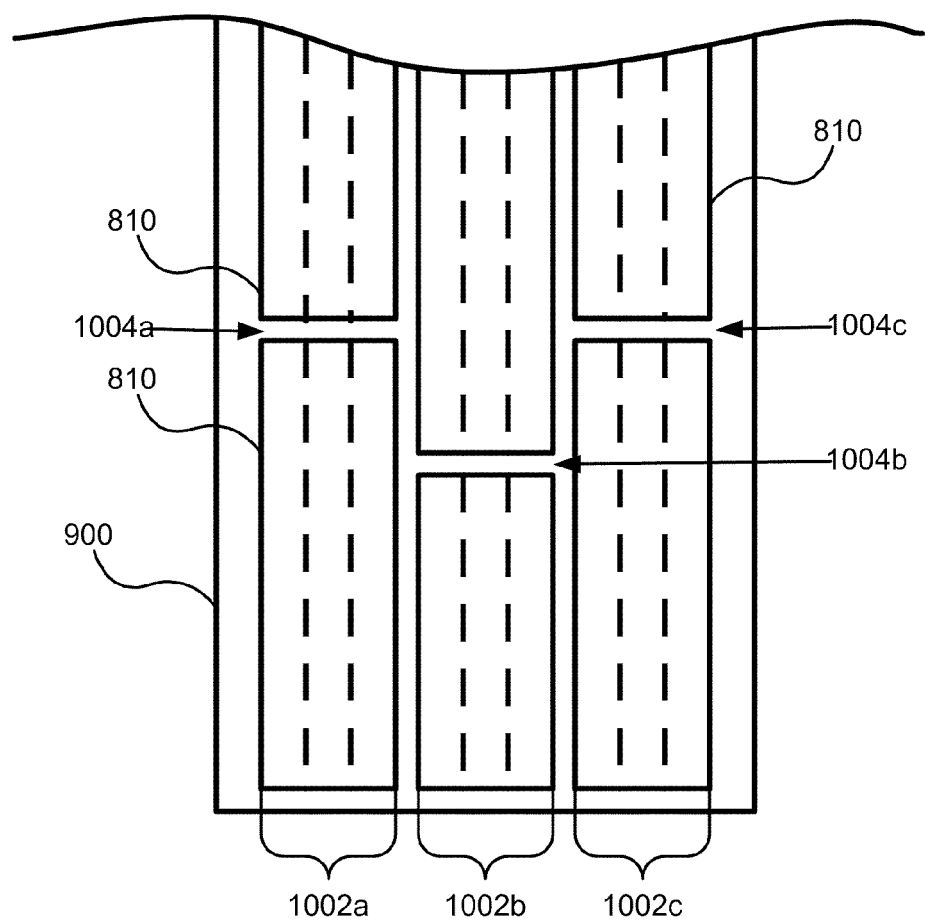
FIG. 10 is a perspective view diagram illustrating one embodiment of pouches in a side-by-side configuration in accordance with the present invention.

FIG. 10 is a block diagram illustrating a side cross-section view of one embodiment of the cartridge 900 in accordance with the present invention. In one embodiment, the rolled pouches 810 may be configured having varying lengths and arranged in courses 1002 as depicted. As used herein, the term "course" refers to a row or column of stacked rolled pouches 810 or single pouches 800. In the embodiment of FIG. 10, the course 1002 includes stacked rolled pouches 810. The different length rolled pouches 810 function to offset course gaps 1004 between rolled pouches 810 in the same course.

Offsetting the course gaps 1004 ensures that hydrogen production will be consistent while the pouches are being submerged during operation as the fill level of liquid reactant rises. For example, if the course gaps 1004 were aligned, when the fill level reached the course gap 1004 hydrogen production would slow until the subsequent stacked pouches 810 begin to be submerged. As depicted, the course gap 1004*a* of course 1002*a* may be aligned with the course gap 1004*c* of course 1002*c* however offset course gap 1004*b* permits hydrogen production to continue. Alternatively, the lengths of the pouches 810 may be configured such that the two course gaps 1004*a* and 1004*c* do not align.

Figure 11A:
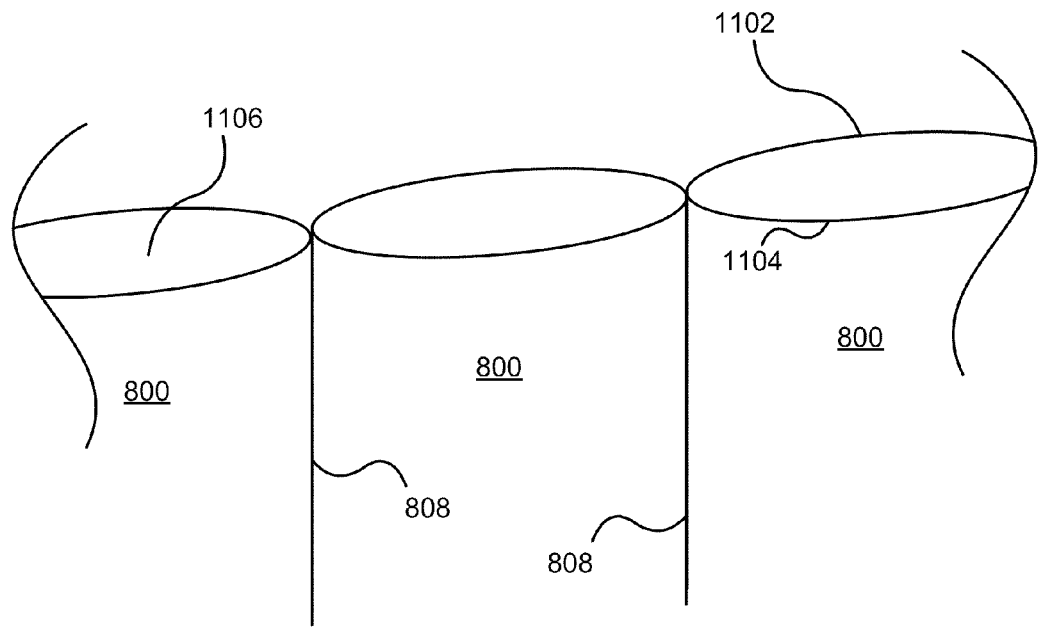
FIG. 11a is a block diagram illustrating one embodiment of a cross-section of a cavity in accordance with the present invention.

FIG. 11*a* is a perspective view diagram illustrating one embodiment of pouches 800 in a side-by-side configuration in accordance with the present invention. In one embodiment, and as described above, each pouch 800 may be formed from two opposing pieces 1102, 1104 of liquid permeable material. The opposing pieces 1102, 1104 may be rectangular in shape, and sealed to form pouches 800. The sealed edges 808 may be formed by stitching, by chemical bonding such as adhesive, or by other methods known to those skilled in the art.

The material, as discussed above, may be selected from liquid permeable woven and non-woven fabrics. The term "liquid permeable," as used herein, refers to a material that allows the passage of a selected liquid through mass transport mechanisms such as, but not limited to, diffusion due to a concentration, pressure, or temperature gradient. The sealed edges 808 form a plurality of cavities 1106 formed by the opposing sheets 1102, 1104 and separated by the sealed edges 808.

Figure 11B:
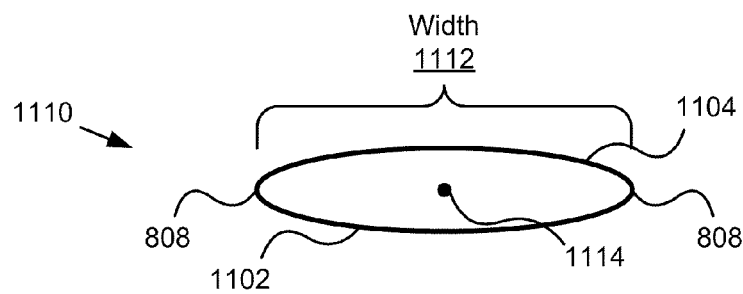
FIG. 11b is a block diagram illustrating one embodiment of a lateral cross-section of a cavity in accordance with the present invention.

FIG. 11*b* is a block diagram illustrating one embodiment of a lateral cross-section of a cavity 1106 in accordance with the present invention. In one embodiment, the cross-section 1110 of the cavity resembles an oval formed by the opposing sheets 1102, 1104 of liquid permeable material. Each pouch may be formed with a width 1112 (or distance between sealed edges 808 in the range of between about 0.25 and 1.25 inches. The width of the pouch 800 is determined according to a liquid permeation distance of the anhydrous hydride reactant. The width of the pouch is selected such that any point 1114 within the cross-sectional area of the cavity is separated from an edge or perimeter 1102, 1104 by no more than double the permeation distance. In one embodiment, the permeation distance may be in a range between about 0.125 inches and about one inch.

Typically a liquid causes a reaction at the surface of an anhydrous hydride when first contact is made. For example, hydrogen generation from borohydrides occurs initially when a water molecule contacts a particle of sodium borohydride. As the reaction continues, a layer of borate can form around a sodium borohydride core. This may be referred to as "encapsulation" or "gumming." The reaction of the unreacted core depends on the ability of the liquid to penetrate or permeate through the reacted borate shell.

The permeation distance of the liquid depends on the type of liquid and anhydrous hydride selected for the hydrogen generation system. Other factors affecting the permeation distance are believed to include dry anhydrous hydride grain size, degree of compaction and settling of the anhydrous hydride, the temperature around the reaction, and the degree of vibration the system is expected to encounter. The permeation distance may also vary in response to the mol ratio between the anhydrous hydride and other components in the reaction, including the liquid reactant and the activating agent. Consequently, the width 1112 of the cavity is selected according to the permeation distance in order to maximize the efficiency of hydrogen production from the anhydrous hydride.

Figure 11C:
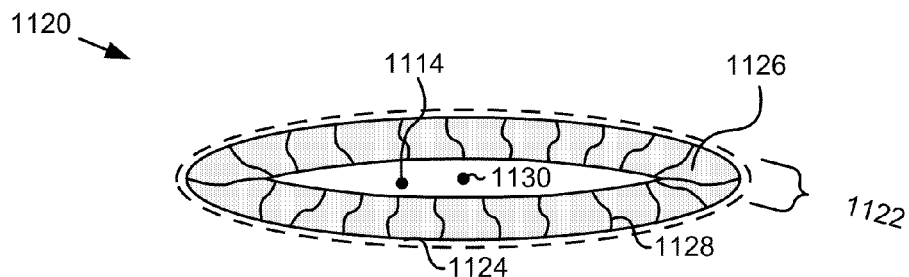
FIG. 11c is a block diagram illustrating another embodiment of a cross-section of a cavity in accordance with the present invention.

FIG. 11c is a block diagram illustrating another embodiment of a cross-section of a cavity 1120 in accordance with the present invention. As depicted, the shaded area of the cavity represents the reacted borate shell having a permeation distance 1122 through which liquid must pass in order to react with the unreacted borohydride core. The point 1114 represents a position within the cross-sectional area of the cavity that is at a distance of no more than twice the permeation distance from the perimeter 1124. During the reaction of the anhydride and the liquid reactant a clumping and gumming layer 1126 begins to form. Due to the reaction and external forces such as gravity and movement of a housing of the reaction, fissures 1128 begin to form within the reacted layer 1126. The fissures permit the liquid reactant to permeate the reacted layer 1126 and thereby react with anhydride within the unreacted anhydride core. In addition, the fissures 1128 may be widened due to by-products dissolving in the liquid reactant.

The present invention sizes the width 1112 of the pouches 800 such that the permeation distance is greater than the distance the liquid reactant must travel from the perimeter 1124 to reach a center point 1130 within the cross-section 1120. In embodiments in which the liquid reactant surrounds the pouch 800, the width 1112 of the pouches 800 is selected such that any point 1114, 1130 within the cross-sectional area of the cavity is at a distance of no more than twice the permeation distance from the perimeter 1124. In embodiments in which the liquid reactant contacts the pouch 800 on a single side, the width 1112 of the pouches 800 is selected such that a diameter of the cross-sectional area of the cavity is at a distance of no more than the permeation distance from the liquid reactant contacting side. In this manner, high energy density is provided within the pouch and little or no anhydride remains unreacted once the liquid reactant is provided.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 12:
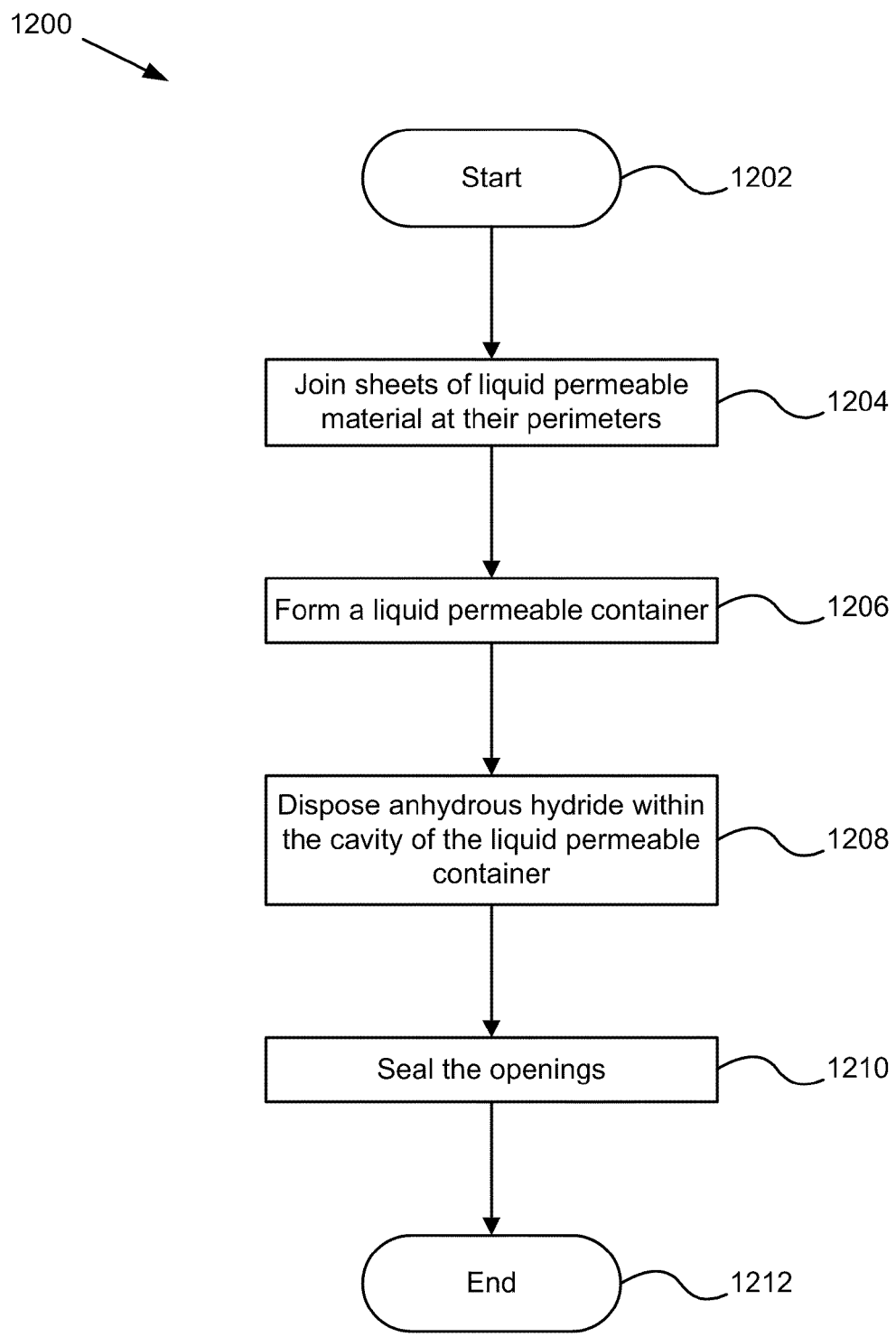
FIG. 12 is a schematic flow chart diagram illustrating one embodiment of a method for making a liquid permeable container in accordance with the present invention.

FIG. 12 is a schematic flow chart diagram illustrating one embodiment of a method 1200 for making a liquid permeable container in accordance with the present invention. The method 1200 starts 1202 and at least two sheets of liquid permeable material 1102, 1104 are joined 1204 at their respective perimeters. In one embodiment, the sheets of liquid permeable material are of substantially equivalent dimensions. In a further embodiment, joining 1204 the sheets comprises mechanical joints such as stitching or welds or chemical joints such as adhesives.

Figure 3B:
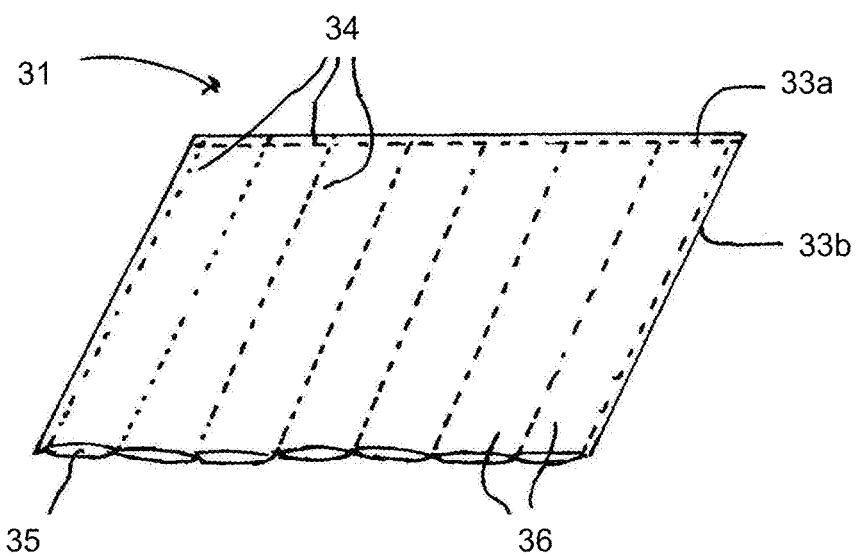
FIG. 3b illustrates one embodiment of the chemical hydride pouch.

At this point the two sheets of liquid permeable material form a single pouch having a cavity for storing anhydrous hydride. The width of the two sheets may be selected to form a single pouch having a width 1112 in the range of between about 0.25 and 1.25 inches, or any width suitable for a desired permeation distance as described above. Alternatively, multiple pouches or cavities may be formed from the two sheets of liquid permeable material. The multiple pouches or containers may be formed 1206 by forming parallel seams within the two joined sheets 1102, 1104 to form a plurality of tubular pouches as illustrated in FIG. 3b.

The width between the seams is selected to maintain a thin uniform distribution of anhydrous hydride reactant in order to prevent gumming as described above with reference to FIGS. 11b and 11c. This beneficially allows for use of a powdered hydrogen source in a direct injection system in a controllable low pressure system. The powder is spread out and retained due to the pouch configuration and therefore does not impede liquid delivery. Specifically, the width is selected so that a point within a cross-section of the container is no farther than double the permeation distance from the perimeter or opposing wall of the liquid permeable material for pouches that will be at least partially submerged.

The method continues and an anhydrous hydride is disposed 1208 or deposited within the cavity of the liquid permeable container. Due to the selected width of the pouch, the anhydrous hydride is deposited in a thin uniform manner in order to prevent the forming of an impenetrable reacted shell. As such, a substantially complete reaction of anhydrous hydride is possible. Any openings may be sealed 1210 and the pouch rolled into a spiral configuration as shown in FIG. 8. The method 1200 then ends 1212.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to promote a substantially complete reaction of an anhydrous reactant, the apparatus comprising:
    one or more liquid permeable pouches, each of the pouches defining a cavity comprising a solid anhydrous reactant;
    a housing configured to receive the one or more pouches and a liquid reactant;
    one or more liquid reactant inlet ports disposed on the housing, the one or more liquid reactant inlet ports configured to deliver the liquid reactant into the housing such that the liquid reactant contacts at least a portion of the one or more pouches; and
    an outlet port configured to release a gas produced by a reaction comprising the solid anhydrous reactant and the liquid reactant.

2. The apparatus of claim 1, wherein the liquid permeable pouch has at least one section formed from a liquid permeable material configured to permit passage of a liquid from one side of the material to an opposite side.

3. The apparatus of claim 1, wherein the solid anhydrous reactant has a liquid permeation distance, the liquid permeation distance comprising a distance the liquid reactant is capable of traveling in reacted solid reactant.

4. The apparatus of claim 3, wherein each cavity comprises a cross-section such that each point within the cross-section is separated from a perimeter of one of the liquid permeable pouches by no more than double the permeation distance.

5. The apparatus of claim 1, wherein the one or more liquid permeable pouches comprise a plurality of tubular liquid permeable pouches in a side-by-side configuration.

6. The apparatus of claim 5, wherein the housing is cylindrical and wherein the plurality of liquid permeable pouches is rolled, a longitudinal axis of the rolled plurality of liquid permeable pouches oriented coaxial with a longitudinal axis of the housing.

7. The apparatus of claim 5, wherein the plurality of liquid permeable pouches are disposed within the housing such that the plurality of liquid permeable pouches form one or more liquid channels directing a flow of liquid reactant around the plurality of liquid permeable pouches.

8. The apparatus of claim 7, wherein the one or more liquid reactant inlet ports comprise a plurality of liquid conduits radially spaced about a longitudinal axis of the cartridge, each liquid conduit positioned alongside at least one tubular liquid permeable pouch.

9. The apparatus of claim 1, wherein the housing is configured to receive a plurality of liquid permeable pouches having different lengths, the liquid permeable pouches stacked and arranged in alternating courses such that a course gap between two stacked liquid permeable pouches does not line up with the gap in an adjacent course of liquid permeable pouches.

10. The apparatus of claim 1, wherein the one or more liquid permeable pouches comprise a pair of opposing walls joined by a pair of opposing longitudinal seams, the width of one wall between opposing longitudinal seams configured to maintain a thin uniform distribution of solid anhydrous reactant within the cavity.

11. The apparatus of claim 1, wherein the one or more liquid reactant inlet ports comprise a liquid conduit configured to extend from a first end of the housing to a location near an opposing second end of the housing such that the housing is filled with the liquid reactant from the second end towards the first end.

12. The apparatus of claim 1, further comprising a first end and an opposing second end, wherein at least one of the one or more liquid reactant inlet ports is located near the second end of the housing, such that the housing fills with the liquid reactant from the second end towards the first end.

13. The apparatus of claim 1, further comprising a liner disposed on the interior of the housing, the liner configured to protect the interior of the housing from corrosion from the liquid reactant and the solid anhydrous reactant.

14. The apparatus of claim 1, wherein the solid anhydrous reactant comprises a dry, powdered activating agent, the dry, powdered activating agent mixed with the solid anhydrous reactant to form a dry powder.

15. A system to promote a substantially complete reaction of an anhydrous reactant, the system comprising:
 a liquid reactant supply comprising a liquid reactant;
 a housing configured to receive the liquid reactant;
 one or more liquid permeable pouches disposed within the housing, each of the pouches defining a cavity comprising a solid anhydrous reactant;
 one or more liquid reactant inlet ports in fluid communication with the liquid reactant supply, the one or more liquid reactant inlet ports configured to deliver the liquid reactant into the housing such that the liquid reactant contacts at least a portion of the one or more pouches; and
 a hydrogen outlet port configured to release hydrogen gas produced by a reaction comprising the solid anhydrous reactant and the liquid reactant.

16. The system of claim 15, wherein the liquid reactant supply comprises a liquid reservoir and one or more pumps, the one or more pumps configured to provide a volume of the liquid reactant from the liquid reservoir to the one or more liquid reactant inlet ports.

17. The system of claim 16, further comprising a control system configured to determine the volume of the liquid reactant that the one or more pumps delivers based on a pressure of the produced hydrogen gas.

18. An apparatus to promote a substantially complete reaction of an anhydrous reactant, the apparatus comprising:
 a cartridge configured to receive a liquid reactant;
 one or more liquid permeable pouches disposed within the cartridge, each of the pouches defining a cavity, each of the pouches having at least one wall formed from material configured to permit passage of a liquid from one side of the material to the other side;
 a solid anhydrous reactant disposed within each of the cavities, the solid anhydrous reactant having a liquid permeation distance, each of the cavities comprising a cross-section such that each point within the cross-section is separated from a perimeter of one of the pouches by no more than double the permeation distance;
 one or more liquid reactant inlet ports configured to deliver the liquid reactant into the cartridge such that the liquid reactant contacts at least a portion of the one or more pouches; and
 a hydrogen outlet port configured to release hydrogen gas produced by a reaction comprising the solid anhydrous reactant and the liquid reactant.

19. The apparatus of claim 18, wherein the one or more liquid permeable pouches comprise two rectangular sheets of liquid permeable material joined at their respective perimeters, the joined sheets having one or more seams that run from a long side of the sheets to an opposing long side of the sheets to form a plurality of liquid permeable pouches, each of the cavities defined by opposite portions of the two sheets and the one or more seams.

20. The apparatus of claim 19, wherein the plurality of liquid permeable pouches are rolled from a short side of the sheets toward an opposite short side to form a spiral configuration.

* * * * *